United States Patent
Pickering

(10) Patent No.: US 7,157,543 B2
(45) Date of Patent: Jan. 2, 2007

(54) BLOCK POLYORGANOSILOXANE BLOCK ORGANOMER POLYMERS AND RELEASE AGENTS

(75) Inventor: Jerry A. Pickering, Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/103,398

(22) Filed: Apr. 11, 2005

(65) Prior Publication Data

US 2005/0182206 A1    Aug. 18, 2005

(51) Int. Cl.
*C08G 77/26* (2006.01)

(52) U.S. Cl. .............................. 528/38; 528/26; 528/28; 528/29; 528/41; 528/42; 525/474

(58) Field of Classification Search ................. 528/26, 528/28, 29, 38, 41, 42; 525/474
See application file for complete search history.

(56) References Cited

U.S. PATENT DOCUMENTS

| | | | |
|---|---|---|---|
| 3,810,776 A | 5/1974 | Banks et al. | |
| 3,937,637 A | 2/1976 | Moser et al. | |
| 4,011,362 A | 3/1977 | Stewart | |
| 4,029,827 A | 6/1977 | Imperial et al. | |
| 4,034,706 A | 7/1977 | Moser | |
| 4,045,164 A | 8/1977 | Moser | |
| 4,046,795 A | 9/1977 | Martin | |
| 4,101,686 A | 7/1978 | Strella et al. | |
| 4,150,181 A | 4/1979 | Smith | |
| 4,185,140 A | 1/1980 | Strella et al. | |
| 4,264,181 A | 4/1981 | Lentz et al. | |
| 4,272,179 A | 6/1981 | Seanor | |
| 4,565,714 A | 1/1986 | Koshar | |
| 4,853,737 A | 8/1989 | Hartley et al. | |
| 5,001,012 A | 3/1991 | Sarkar et al. | |
| 5,141,788 A | 8/1992 | Badesha et al. | |
| 5,147,957 A | 9/1992 | Kumar | |
| 5,157,445 A | 10/1992 | Shoji et al. | |
| 5,200,284 A | 4/1993 | Chen et al. | |
| 5,281,506 A | 1/1994 | Badesha et al. | |
| 5,489,482 A | 2/1996 | Minemura et al. | |
| 5,512,409 A | 4/1996 | Henry et al. | |
| 5,516,361 A | 5/1996 | Chow et al. | |
| 5,531,813 A | 7/1996 | Henry et al. | |
| 5,568,239 A | 10/1996 | Furukawa et al. | |
| 5,627,000 A | 5/1997 | Yamazaki et al. | |
| 5,636,012 A | 6/1997 | Uneme et al. | |
| 5,641,603 A | 6/1997 | Yamazaki et al. | |
| 5,735,945 A | 4/1998 | Chen et al. | |
| 5,780,545 A | 7/1998 | Chen et al. | |
| 5,783,719 A | 7/1998 | Sun et al. | |
| 5,835,833 A | 11/1998 | Dalal et al. | |
| 5,925,779 A | 7/1999 | Cray et al. | |
| 5,943,542 A | 8/1999 | Dalal et al. | |
| 5,959,056 A | 9/1999 | Beach et al. | |
| 6,011,946 A | 1/2000 | Eddy et al. | |
| 6,261,688 B1 | 7/2001 | Kaplan et al. | |
| 6,515,069 B1 | 2/2003 | Gervasi et al. | |
| 6,566,027 B1 | 5/2003 | Kaplan et al. | |
| 2003/0050420 A1 | 3/2003 | Pickering et al. | |
| 2003/0232945 A1 | 12/2003 | Pickering et al. | |

FOREIGN PATENT DOCUMENTS

JP     08-109580     4/1996

OTHER PUBLICATIONS

Barton, CRC Handbook of Solubility Parameters and Other Cohesion Parameters, 2nd Edition, CRC Press, Inc., Boca Raton, FL, pp. 95, 108-109, 177-185k (1991).

*Primary Examiner*—Kuo-Liang Peng
(74) *Attorney, Agent, or Firm*—Carl F. Ruoff

(57) ABSTRACT

A polyorganosiloxane block hydrocarbyl block polymer having utility as a release agent in toner fusing systems. The polymer has one or more polar linkages, with each such linkage bonding a polyorganosiloxane block and a hydrocarbyl block, and also including a polar functionality.

33 Claims, No Drawings

BLOCK POLYORGANOSILOXANE BLOCK ORGANOMER POLYMERS AND RELEASE AGENTS

CROSS-REFERENCE TO RELATED APPLICATIONS

This application claims benefit under 35 USC§119(e) of prior co-pending pending U.S. 6,894,137. Said patent application is incorporated herein in its entirety, by reference thereto.

Filed concurrently with this application is the application entitled "Molecular Complexes and Release Agents", Applicants' Docket Nos. 10274 and PAT00013. This concurrently filed application is incorporated herein in its entirety, by reference thereto.

BACKGROUND OF THE INVENTION

1. Field of the Invention

The present invention relates to a composition comprising a release agent, for application to one or more fuser members and the substrate in toner fusing systems and processes. The present invention further relates to combating toner offset by means of applying the composition as indicated to one or more fuser members in toner fusing systems and processes.

2. Description of Background and Other Information

Generally in electrostatographic reproduction, the original to be copied is rendered in the form of a latent electrostatic image on a photosensitive member. This latent image is made visible by the application of electrically charged toner.

The toner thusly forming the image is transferred to a substrate—also referred to in the art as a receiver—such as paper or transparent film, and fixed or fused to the substrate. Where heat softenable toners—for example, comprising thermoplastic polymeric binders—are employed, the usual method of fixing the toner to the substrate involves applying heat to the toner, once it is on the substrate surface, to soften it, and then allowing or causing the toner to cool. This application of heat in the fusing process is preferably at a temperature of about 90° C.–220° C.; pressure may be employed in conjunction with the heat.

A system or assembly for providing the requisite heat and pressure is generally provided as a fusing subsystem, and customarily includes a fuser member and a support member. The various members that comprise the fusing subsystem are considered to be fusing members; of these, the fuser member is the particular member that contacts the toner to be fused by the fusing subsystem. The heat energy employed in the fusing process generally is transmitted to toner on the substrate by the fuser member. Specifically, the fuser member is heated; to transfer heat energy to toner situated on a surface of the substrate, the fuser member contacts this toner, and correspondingly also can contact this surface of the substrate itself. The support member contacts an opposing surface of the substrate.

Accordingly, the substrate can be situated or positioned between the fuser and support members, so that these members can act together on the substrate to provide the requisite pressure in the fusing process. In cooperating, preferably the fuser and support members define a nip, or contact arc, in which the substrate is positioned or resides, and/or through which the substrate passes. Also as a matter of preference, the fuser and support members are in the form of fuser and pressure rollers, respectively. Yet additionally as a matter of preference, one or both of the fuser and support members have a soft layer that increases the nip, to effect better transfer of heat to fuse the toner.

During the fusing process toner can be offset from the substrate to the fuser member. Toner thusly transferred to the fuser member in turn may be passed on to other members in the electrostatographic apparatus, or to subsequent substrates subjected to fusing.

Toner on the fusing member therefore can interfere with the operation of the electrostatographic apparatus and with the quality of the ultimate product of the electrostatographic process. This offset toner is accordingly regarded as contamination of the fuser member, and preventing or at least minimizing this contamination is a desirable objective.

Toner offset is a particular problem when polyester toners are used. Polyester toners are frequently used in high quality color and black and white printing applications. In particular, offset to the fuser member can collect on other members of the fusing subsystem, such as external heating members for heating fuser members, and release agent applicators—e.g., oilers.

In this regard, release agents can be applied to fusing members during the fusing process, to combat toner offset. These agents usually are or include polyorgano-siloxanes, particularly polyorganosiloxane oils. The polysiloxanes have antiadhesive properties that are favorable for protecting the surface of the fuser member, and maintaining the durability of the fuser member.

Modified polysiloxanes having functional groups provide a protective barrier by attaching to the fuser surface via specific interactions between the functional groups and the fuser surface. The interaction of the functional groups with the fuser surface allows the polysiloxane to sterically block contact of the toner with the fuser member surface and provide a protective barrier. Monofunctional polysiloxanes with one, reactive functional group may interact with the fuser member or toner surface to provide a protective coating as well as increase the wetting of nonfunctional components in the polymeric release agent composition. Multifunctional polysiloxanes with more than one reactive group also interact in the same manner to provide a protective coating; however, the presence of more than one functional group may allow undesired additional interaction with other components.

As to functional polyorganosiloxanes, U.S. Pat. No. 6,261,688 and U.S. Publication No. 2001/0019768 disclose polymeric release agents comprising organosiloxane polymers with tertiary amino functional groups. Among the tertiary amino functional groups disclosed are those where the N atom has an alkyl or arylalkyl as one substituent group, and an acyl [—C(=O)—CH$_3$] group as the other.

Further, U.S. Pat. No. 5,157,445 discloses a toner release oil composition containing an organopolysiloxane with one or more secondary amino substituents, where the secondary amine N atom has a C$_{1-8}$ alkylene substituent terminated by NH$_2$. Also disclosed as eligible release oil ingredients are organopolysiloxanes having aromatic secondary amino substituents.

U.S. Pat. Nos. 5,531,813 and 5,512,409 disclose secondary amino functional polyorganosiloxanes, where the N atom can have—besides the H atom—a C$_{1-18}$ alkyl or arylalkyl substituent. These patents also disclose the polyorganosiloxanes as monoamino functional polymers, with the monoamino functionality interacting with the hydrofluoroelastomer surface of a fuser member; this interaction is stated to provide a barrier to the toner, as well as a low surface energy film to release the toner from the surface.

Additionally as to monoamino functionality in particular, branched T-type monoamino functional polysiloxanes, in which the reactive group is attached to a central silicon atom, are disclosed in U.S. Pat. No. 5,516,361.

Functional polysiloxanes also are described in U.S. Pat. No. 4,101,686, which discloses polymeric release agents having functional groups such as carboxyl, hydroxy, epoxy, amino, isocyanate, thioether, and mercapto groups. This patent states that the polymeric release agents are applied to a heated fuser member to prevent toner adhesion. Similarly, U.S. Pat. Nos. 4,272,179 and 4,264,181 disclose polymeric release agents which have functional groups, and which are applied to the surface of a fuser member.

Additionally, U.S. Pat. Nos. 5,141,788 and 5,281,506 disclose a fuser member comprising a polyorganosiloxane having reactive functional groups which is grafted to the surface of the cured fluoroelastomer layer. U.S. Pat. No. 4,853,737 also discloses a fuser roller having an outer layer comprising a cured fluoroelastomer, with polydiorganosiloxane segments that are covalently bonded to the backbone of the fluoroelastomer; the polydiorganosiloxanes have functional groups, at least one of which is present on the polydiorganosiloxane chain to form the covalent bond to the fluoroelastomer backbone.

U.S. Provisional Patent Application No. 60/305,874, filed Jul. 18, 2001, discloses monofunctional branched polysiloxanes, wherein the branched siloxane chain provides enhanced coverage of the surface and resistance to extension under shear. This provisional application is incorporated herein in its entirety, by reference thereto.

In addition to functional groups, polysiloxane release fluids have been modified with nonreactive organo groups that promote interaction or wetting of surface components. U.S. Pat. No. 5,780,545 discloses a stabilized polyether modified organosiloxane that acts as a surfactant to promote wetting and that reduces offset. U.S. Pat. Nos. 5,568,239, 5,641,603, 5,627,000, and 5,636,012 disclose polyorganosiloxanes modified with side groups or end groups of fluorocarbon chains, for promoting the wetting of fluorocarbon surfaces such as tetrafluoroethylene. U.S. Pat. Nos. 5,783,719 and 5,959,056 disclose long chain hydrocarbon modification of organosiloxanes as solid release agents, and as being useful for other purposes—e.g., sealing toner cartridges; further, it is suggested that the long hydrocarbon chain may also act as a surfactant for the toner.

It would be desirable to have an agent that promotes wetting as a surfactant, and that also exhibits reactivity to and/or interaction with polar sites—on the toner, or on the fuser member surface—to act against or combat adherence of the toner to surfaces, or to polar sites on fuser members, that tend to attract toner offset. It would further be desirable that the composition could be easily prepared. It would yet additionally be desirable that the composition have labile hydrogen for reacting to surfaces.

SUMMARY OF THE INVENTION

The present invention is characterized by novel block polyorganosiloxane block organomer polymers—the organomer or organomers being selected from hydrocarbons and perhalopolyethers—that exhibit improved wetting of toner surfaces, while still interacting with polar sites to combat—e.g., prevent or prohibit, or at least inhibit, or lessen, or reduce—toner offset. The present invention further provides novel block polyorganosiloxane block organomer polymers that demonstrate improved wetting of fluorocarbon surfaces, while still interacting with polar sites to prevent toner offset.

The novel block polyorganosiloxane block organomer polymers of the invention may be used for imparting—to the fusing member substrate surfaces, and to toner residing or contacting thereon—resistance to toner offset and accumulation on fusing members. In this regard, the invention pertains to a composition for acting against, or combating—e.g., preventing or prohibiting, or at least inhibiting, or lessening, or reducing—toner offset and buildup on fusing members.

The invention further pertains to a process for fusing toner residing on a substrate surface to the substrate surface. This process comprises applying, to the surface of a fuser member, novel block polyorganosiloxane block organomer polymer of the invention as a polymeric release agent, and contacting the toner with the fuser member surface bearing this composition.

The invention further describes a method for preparing the release agent of the invention.

DESCRIPTION OF THE INVENTION

Copolymers are understood as including polymers incorporating two monomeric units, i.e., bipolymers, as well as polymers incorporating three or more different monomeric units, e.g., terpolymers, tetrapolymers, quaterpolymers, etc.

Polyorganosiloxanes are understood as including functional and nonfunctional polyorganosiloxanes. Polyorganosiloxanes further are understood as including polydiorganosiloxanes—i.e., having two organo groups attached to each, or substantially each, or essentially each, of the polymer siloxy repeat units. Polyorganosiloxanes yet further are understood as including polydimethylsiloxanes.

Functional polyorganosiloxanes are understood as being polyorganosiloxanes having functional groups on the backbone, connected to the polysiloxane portion, which can react with fillers present on the surface of the fuser member, or with a polymeric fuser member surface layer or component thereof. Functional polyorganosiloxanes further are understood as being polyorganosiloxanes having functional groups such as amino, hydride, halo (including chloro, bromo, fluoro, and iodo), carboxy, hydroxy, epoxy, isocyanate, thioether, and mercapto functional groups. Nonfunctional polyorganosiloxanes further are understood as being polyorganosiloxanes without groups of the type as indicated.

The term "hydrocarbyl" is understood as including "aliphatic", "cycloaliphatic", and "aromatic", and "hydrocarbyl" further is understood as including saturated, unsaturated, linear, branched, cyclic, and acyclic "hydrocarbyl". "Hydrocarbyl" is also understood as including "alkyl", "alkenyl", "alkynl", "cycloalkyl", "aryl", "aralkyl", and "alkaryl". Additionally, "hydrocarbyl" is understood as including both nonsubstituted hydrocarbyl and substituted hydrocarbyl, with the former referring to the hydrocarbyl consisting of, or consisting essentially of, carbon and hydrogen atoms, and the latter referring to the hydrocarbyl bearing one or more additional substituents. The one or more additional substituents can be present along with carbon and hydrogen atoms, and or can be present in place of one, or more, or all, of the hydrogen atoms. Substituted hydrocarbyl encompasses halocarbyl (e.g., chloro, bromo, iodo, and especially fluorocarbyl), particularly haloalkyl (e.g., chloro, bromo, iodo, and especially fluoroalkyl), and encompasses fully and partially halogenated (e.g., chlorinated, brominated, iodinated, and especially fluorinated) hydrocarbyl, including perhalocarbyl (e.g., perchloro, perbromo, periodo, and perfluorocarbyl), and particularly perhaloalkyl (e.g., perchloro, perbromo, periodo, and especially perfluoroalkyl).

Further with respect to the foregoing, "hydrocarbyl" is understood as including nonhalogenated hydrocarbyl, which refers to hydrocarbyl that is free, or at least essentially free, or at least substantially free, of halogenation—i.e., of chlorine, bromine, iodine, and fluorine atoms. Correspondingly, "hydrocarbyl" is understood as including nonfluorinated, nonchlorinated, nonbrominated, and noniodinated hydrocarbyl; these refer to hydrocarbyl that is free, or at least essentially free, or at least substantially free, respectively, specifically of fluorination (i.e., of fluorine atoms), chlorination (i.e., of chlorine atoms), bromination (i.e., of bromine atoms), and iodination (i.e., of iodine atoms).

The term "organo" as used herein, such as in the context of polyorganosiloxanes, includes hydrocarbyl. Preferred organo groups for the polyorganosiloxanes are the alkyl, aryl, and aralkyl groups. Particularly preferred alkyl, aryl, and aralkyl groups are the $C_1$–$C_{18}$ alkyl, aryl, and aralkyl groups, particularly the methyl and phenyl groups.

It is understood that use conditions are those conditions, such as temperature, at which the release agent of the invention, or a component thereof, is being manipulated—for instance, physically transferred—in conjunction with their employment for a process of the invention. In this regard, use conditions include the conditions under which the release agent or component is depleted from its sump, or storage area, as well as conditions in the electrostatographic reproduction apparatus and system during operation, particularly fusing process conditions, and conditions under which the release agent or component is being applied to the toner and/or substrate surface.

Organomers include hydrocarbons and perhalopolyethers, and organomer blocks correspondingly include hydrocarbyl blocks and perhalopolyether blocks. The preferred perhalopolyethers are the perfluoropolyethers.

The term "halo" as used herein includes chloro, bromo, iodo, and fluoro.

Unless stated otherwise, molecular weights set forth herein are number average molecular weights ($M_n$), measured in Daltons.

The polarity value of a group—i.e., a group of two or more covalently bonded atoms—is determined using modified Hansen dispersion, polar, and hydrogen bonding parameters for the group. These modified Hansen parameters are calculated using the procedure for calculating Hansen parameters from the Hansen group contribution values—with a variation to this procedure.

The Hansen parameter calculation procedure is set forth in Table 16, at page 185, of the CRC Handbook of Solubility Parameters and Other Cohesion Parameters, Second Edition, Allan F. Barton, Ph.D. (1991); this handbook is incorporated herein in its entirety, by reference thereto. The indicated variation to this procedure is that the group molar volume, employed for calculating all three parameters, is determined using 0.85 g/cm$^3$ as the density value.

As for the modified Hansen parameters calculated according to the foregoing procedure, the modified polar parameter and the modified hydrogen bonding parameter are added together, and the sum of these two parameters is divided by the modified dispersion parameter. The result is the polarity value.

A polymer of the invention comprises at least one polyorganosiloxane block, at least one organomer block, and at least one group, or linkage—particularly, at least one polar group, or polar linkage—covalently bonding a polyorganosiloxane block and an organomer block. The at least one organomer block comprises at least one member selected from the group consisting of hydrocarbyl blocks and perhalopolyether blocks.

Each polar linkage includes a group, or functionality—particularly, a polar group, or polar functionality—that has a polarity value of at least about 1.8, more preferably of at least about 2, and still more preferably of at least about 2.6. Specifically, polar functionalities of the invention have polarity values of at least about 1.8, more preferably of at least about 2, and still more preferably of at least about 2.6.

The polarity value of a polar functionality is determined by finding, within the functionality, the group of connected atoms that itself has the highest polarity value, and also comprises at least three atoms, with at least one of these three atoms being a carbon atom; this group may be made up of a part, or all, of the atoms of the polar functionality. The polarity value of this group is the polarity value of the polar functionality.

Preferably the polar functionality comprises a hydrogen atom that is hydrogen bondable (i.e., a hydrogen bondable H atom). A polar linkage can consist of, or consist essentially of, or consist substantially of, the polar functionality as discussed, or it can further include one or more substituents in addition to the polar functionality.

Each—or at least essentially each, or at least substantially each—polyorganosiloxane block can be covalently bonded to at least one organomer block by a polar linkage, and/or each—or at least essentially each, or at least substantially each—organomer block can be covalently bonded to at least one polyorganosiloxane block by a polar linkage. As a matter of particular preference, each, or at least essentially each, or at least substantially each, connection between a polyorganosiloxane block and an organomer block comprises a polar linkage covalently bonding these blocks.

The polymers of the invention can be referred to as block polyorganosiloxane block organomer polymers. Polymers of the invention include graft polymers and block polymers. A polymer of the invention may be in a linear configuration and/or in a branched configuration.

A linear configuration can comprise alternating linear polyorganosiloxane and organomer blocks—one or more of each—sequentially connected at their block ends. With respect to the foregoing, a block end comprises a terminal siloxy unit, C atom, or perhalocarboxy unit of the polyorganosiloxane block, hydrocarbyl block, perhalopolyether block, respectively.

A branched configuration can comprise at least one linear polyorganosiloxane block connected to one or more linear organomer blocks along the polyorganosiloxane block, with at least one polyorganosiloxane block/organomer block connection being at a siloxy unit of the polyorganosiloxane block which is not a terminal siloxy unit thereof (i.e., which is a nonterminal siloxy unit thereof); and/or, at least one linear organomer block connected to one or more linear polyorganosiloxane blocks along the organomer block, with at least one polyorganosiloxane block/organomer block connection being at a C atom (perhalocarboxy unit) of the hydrocarbyl (perhalopolyether) block which is a nonterminal C atom (perhalocarboxy unit) thereof. The at least one polyorganosiloxane block/organomer block connection may be between a terminal unit (C atom) of one and a nonterminal unit (C atom) of the other, or between nonterminalities of both—i.e., between a polyorganosiloxane nonterminal siloxy unit and a perhalopolyether nonterminal perhalocarboxy unit, or between a polyorganosiloxane nonterminal siloxy unit and a hydrocarbyl nonterminal C atom.

Polymers of the invention include diblock polymers, triblock polymers, etc. Preferred polymers of the invention are diblock polymers of one polyorganosiloxane block and one organomer block, triblock polymers of two polyorganosiloxane blocks and one organomer block, and triblock polymers of two organomer blocks and one polyorganosiloxane block. Of these, linear and branched diblock polymers, and linear and branched triblock polymers, are particularly preferred, with the linear and branched diblock polymers being the most preferred.

Preferably the polymers of the invention have a molecular weight of about 3,000 or greater. More preferably, polymers of the invention have a molecular weight of from about 4,000 to about 250,000, and still more preferably of from about 6,000 to about 100,000.

Regarding polar linkages, and particularly as to polar functionalities, among these functionalities are secondary amine groups, hydroxyl groups, and phenolic groups. Preferably for the present invention, the polar functionality comprises, as discussed, a hydrogen bondable H atom.

Also as a matter of preference, the polar functionality comprises both a hydrogen bond donor, or donating group—i.e., a group that provides the hydrogen bondable H atom—and also a hydrogen bond acceptor, or accepting group. As indicated, the hydrogen bond donating and accepting groups are separate and different entities—i.e., they do not have any atoms in common; both groups are part of the polar functionality. Yet additionally as a matter of preference, the hydrogen bond donors and acceptors are adjacent, with an atom of one group covalently bonded to an atom of the other.

A suitable hydrogen bond donor is —NH—. A suitable hydrogen bond acceptor is the carbonyl group,

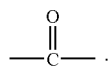

Preferred polar functionalities that include both a hydrogen bond donor and a hydrogen bond acceptor are amide incorporating groups—i.e., groups incorporating the amide configuration. An amide incorporating group which may be used is the amide group itself—i.e.,

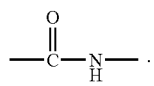

Additional suitable amide incorporating groups are the urea group—i.e.,

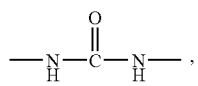

and the urethane group, i.e.,

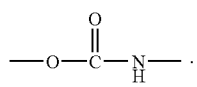

An advantage of the amide incorporating polar functionalities is that the —NH— hydrogen bonding is enhanced by the amide configuration. Particularly, the

group activates the —NH—group, thereby causing the polar functionality to provide stronger hydrogen bonding.

As to the foregoing three particular polar functionalities, the polarity value for the amide group is determined from the entire amide group, while for the urea group either of the amide configurations within the group can be used, and for the urethane group also the incorporated amide configuration is used. Each of these three polar functionalities has a polarity value of about 2.8.

Polymers of the invention are prepared from polyorganosiloxane and organomer precursors of the corresponding polyorganosiloxane and organomer blocks. Polyorganosiloxanes, hydrocarbons, and perhalopolyethers that may be used as precursors for the present invention may be prepared in accordance with processes as are known in the art. Suitable polyorganosiloxane, hydrocarbon, and perhalopolyether precursors include polyorganosiloxane, hydrocarbon, and perhalopolyether polymers, oligomers, and macromers.

A polyorganosiloxane precursor of the invention comprises a polyorganosiloxane having at least one polar linkage forming group, or moiety—i.e., having one of these groups, or moieties, or having two or more of these groups, or moieties. Correspondingly, an organomer precursor of the invention comprises an organomer having at least one polar linkage forming group, or moiety—i.e., having one of these groups, or moieties, or having two or more of these groups, or moieties.

Polar linkage forming moieties include functional groups that react to form the polar functionalities; these functional groups can be referred to as polar functionality forming groups. A polar linkage forming moiety can consist of, or consist essentially of, or consist substantially of, a polar functionality forming group as indicated, or it can further include one or more substituents in addition to the polar functionality forming group.

The polar linkage forming moieties and polar functionality forming groups, of the polyorganosiloxane precursors, can be referred to as first polar linkage forming moieties and first polar functionality forming groups, respectively. Correspondingly, the polar linkage forming moieties and polar functionality forming groups, of the organomer precursors, can be referred to as second polar linkage forming moieties and second polar functionality forming groups, respectively.

The polar linkage of the invention is obtained from the reaction between a polar linkage forming moiety of a polyorganosiloxane precursor, and a polar linkage forming moiety of an organomer precursor—i.e., between a first polar linkage forming moiety and a second polar linkage forming moiety. Specifically, the polar functionality forming groups of the respective polar linkage forming moieties (i.e., first and second polar functionality forming groups)—react to provide the polar functionality.

Polyorganosiloxane blocks of the invention, which can also be referred to as release blocks, include linear blocks and branched blocks. Preferred polyorganosiloxane blocks are polydimethylsiloxane blocks—i.e., derived from the corresponding polydimethylsiloxane precursors.

The polyorganosiloxane blocks of the present invention include homopolymer blocks and copolymer blocks of dimethylsiloxane, diphenylsiloxane, methyl-3,3,3-trifluoropropylsiloxane, and methylphenylsiloxane monomeric units. Preferred polyorganosiloxane blocks include polydimethylsiloxane, polyphenylmethylsiloxane, polydiphenylsiloxane, poly(diphenyl-co-dimethyl)siloxane, and poly(phenylmethyl-co-diphenyl)siloxane, with polydimethylsiloxane being most preferred.

Polyorganosiloxane blocks and precursors of the invention preferably have a molecular weight of from about 2,000 to about 250,000. More preferably, polyorganosiloxane blocks and precursors of the invention have a molecular weight of from about 4,000 to about 120,000, and still more preferably of from about 6,000 to about 80,000.

Suitable polyorganosiloxane precursors include linear polyorganosiloxane precursors having one polar linkage forming moiety, and linear polyorganosiloxane precursors having two or more polar linkage forming moieties. Branched polyorganosiloxane precursors having one polar linkage forming moiety, and branched polyorganosiloxane precursors having two or more polar linkage forming moieties, also may be used.

It is preferred that the covalent linkage, to the polyorganosiloxane block, be stabilized against intra-molecular reaction. A means for achieving this objective is to utilize a polar linkage forming moiety which separates the polar functionality forming group from the polyorganosiloxane block by at least three carbon atoms, and particularly by at least three methylene units—especially in the case of carboxyl polar functionality forming groups, and in the case of primary amine polar functionality forming groups, and with halo (particularly fluoro) functional groups as well.

Accordingly, preferred polar linkage forming moieties for the polyorganosiloxane precursors comprise $C_3$ and greater hydrocarbyl spacer groups, and particularly $C_3$ and greater alkyl spacer groups, connecting the polar functionality forming groups to the polyorganosiloxane blocks. Of these, the n-alkyl spacer groups are especially preferred, with the n-propyl spacer group being most preferred.

Among the linear polyorganosiloxane precursors that may be used are those with one or more pendant or side polar linkage forming moieties and/or one or more terminating polar linkage forming moieties. In this regard, it is understood that pendant, or side, polar linkage forming moieties are attached along the polyorganosiloxane backbone, to nonterminal siloxy units, and that terminating polar linkage forming moieties are attached on the polyorgano-siloxane backbone, to terminal siloxy units.

Further as to linear polyorganosiloxane precursors, those that may be used for providing the polyorganosiloxane blocks include linear polyorganosiloxanes having a single polar linkage forming moiety which is a terminating moiety—i.e., with this polar linkage forming moiety attached to one terminal siloxy unit of the corresponding polyorganosiloxane block, and thereby terminating one end of the linear precursor. Also suitable as precursors are linear polyorganosiloxanes with two polar linkage forming moieties, both of which are terminating moieties—i.e., having one of the polar linkage forming moieties attached at either terminal siloxy unit of the corresponding polyorganosiloxane block, and thereby terminating both ends of the linear precursor.

Yet additionally as to linear polyorganosiloxane precursors, those that may be used include precursors having the formula

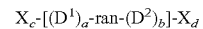

wherein

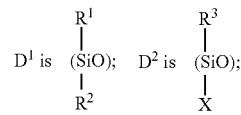

$R^1$, $R^2$, and $R^3$ are the same or different, and are selected from the group consisting of $C_1$–$C_{10}$ hydrocarbyl groups;

X is a polar linkage forming moiety;

a is 40 to 2500;

b is 0 to 4;

c is 0 or 1;

d is 0 or 1; and b+c+d is 1 to 4.

Preferably $R^1$, $R^2$, and $R^3$ are methyl groups, a is 60 to 2000, b is 0 to 1, and b+c+d is 1 or 2.

Branched polyorganosiloxane precursors that may be used include those having the formula

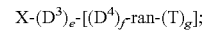

and being endcapped by

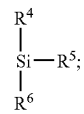

wherein

X-$(D^3)_e$ is a linear moiety;

$[(D^4)_f$-ran-$(T)_g]$ is a branched moiety;

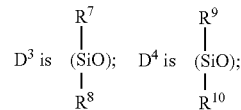

$R^4$, $R^5$, $R^6$, $R^7$, $R^8$, $R^9$, $R^{10}$, and $R^{11}$ are the same or different, and are selected from the group consisting of $C_1$–$C_{10}$ hydrocarbyl groups;

X is a polar linkage forming moiety;

T is $(R^{11})_h SiO_{(4-h)/2}$;

e is 1 to 300;

f is 25 to 5000;

g is 2 to 100; and h is 0 or 1.

Branched polysiloxanes, particularly monofunctional branched polysiloxanes, disclosed in U.S. Provisional Application No. 60/305,874, filed Jul. 18, 2001, are suitable branched polyorganosiloxane precursors for the present invention. Further, the process disclosed therein for preparing branched polysiloxanes are suitable for preparing branched polyorganosiloxane precursors for the present invention.

Hydrocarbyl blocks of the invention include linear blocks and branched blocks. Preferred hydrocarbyl blocks are nonsubstituted hydrocarbyl blocks—particularly, consisting or consisting essentially of carbon and hydrogen atoms, and derived from the corresponding nonsubstituted hydrocarbon precursors—with alkyl blocks, such as lauryl and stearyl groups, being particularly preferred. Also preferred are nonhalogenated hydrocarbyl blocks, especially nonhalogenated alkyl blocks, and nonfluorinated hydrocarbyl blocks, especially nonfluorinated alkyl blocks, are particularly preferred—particularly, here also, blocks derived from the corresponding hydrocarbon precursors.

Suitable hydrocarbon precursors of the invention, and accordingly the hydrocarbyl blocks derived therefrom, include hydrocarbon waxes and oils. These include hydrocarbons that are oils at 25° C., and still liquid at operating temperatures, particularly fusing process temperatures, and hydrocarbons that are waxes at 25° C., but liquid at operating temperatures, particularly fusing process temperatures.

Among the hydrocarbyl blocks and hydrocarbon precursors which can be used are hydrocarbyl blocks, such as hydrocarbyl chains, and hydrocarbon precursors, such as hydrocarbon precursor chains, comprising at least about 8 C atoms, more preferably at least about 16 C atoms, still more preferably at least about 22 C atoms, still more preferably at least about 30 C atoms, still more preferably about 40 C atoms, or at least about 40 C atoms, and still more preferably at least about 50 C atoms. Also among the hydrocarbyl blocks and hydrocarbon precursors which can be used are hydrocarbyl blocks, such as hydrocarbyl chains, and hydrocarbon precursors, such as hydrocarbon precursor chains, comprising from about 8 to about 600 C atoms, more preferably from about 16 to about 500 C atoms, still more preferably from about 22 to about 400 C atoms, still more preferably from about 30 to about 400 C atoms, and still more preferably from about 40 to about 200 C atoms. The hydrocarbon precursors, and the corresponding hydrocarbyl blocks, may be subject to minor modification, such as a small degree of, or slight, oxidation.

Particular hydrocarbyl blocks which are suitable are polyethylene blocks. Polyethylene blocks and precursors of the invention preferably have a molecular weight of from about 300 to about 10,000.

Halocarbyl (especially haloalkyl) blocks also are suitable hydrocarbyl blocks of the invention. Preferred haloalkyl blocks are the perhaloalkyl blocks, especially the perfluoroalkyl blocks, such as the perfluorodecanyl and perfluorotetradecanyl groups.

Particularly as to fluorocarbyl blocks, the presence of these improves the wetting—by polymers of the invention—of fuser member surfaces which themselves are fluorinated, or include fluorine substituents, as discussed. Examples of these surfaces are those comprising polyfluorocarbons. Suitable polyfluorocarbons include fluoroelastomers. Also included are nonelastomeric fluorocarbon materials, such as fluoroplastics and fluororesins, like polytetrafluoroethylene (PTFE), and copolymers of tetrafluoroethylene (TFE) and perfluoroalkylvinylether (PFA), and fluorinated ethylene propylene copolymers. However, fluorocarbon precursors and their corresponding blocks are characterized by higher surface activity, and the precursors have relatively lower compatibility, particularly with polyorganosiloxanes. For this reason, preferably the fluorocarbyl blocks are somewhat smaller in size.

In this regard, the halocarbyl blocks and halocarbon precursors, such as perhaloalkyl blocks and perhaloalkane precursors, preferably comprise from about 4 to about 50 C atoms. More preferably, the halocarbyl blocks and halocarbon precursors, such as perhaloalkyl blocks and perhaloalkane precursors, comprise from about 6 to about 30 C atoms; still more preferably, from about 8 to about 20 C atoms.

Particularly as to the perfluoroalkyl blocks, those comprising an even number of carbon atoms are simple irritants. However, there are perfluoroalkyl blocks with odd numbers of carbon atoms that are known to be toxic. Accordingly, the even number blocks are preferred.

Preferably, the hydrocarbon precursors are low vapor pressure, nontoxic, nonsensitizing molecules. Suitable hydrocarbon precursors include linear hydrocarbon precursors having one polar linkage forming moiety, and linear hydrocarbon precursors having two or more polar linkage forming moieties. Branched hydrocarbon precursors having one polar linkage forming moiety, and branched hydrocarbon precursors having two or more polar linkage forming moieties, also may be used.

Among the linear hydrocarbon precursors that may be used are those with one or more pendant or side polar linkage forming moieties and/or one or more terminating polar linkage forming moieties. In this regard, it is understood that pendant, or side, polar linkage forming moieties are attached along the hydrocarbon backbone, to nonterminal C atoms, and that terminating polar linkage forming moieties are attached on the hydrocarbon backbone, to terminal C atoms.

Further as to linear hydrocarbon precursors, those that may be used for providing the hydrocarbyl blocks include linear hydrocarbons having a single polar linkage forming moiety which is a terminating moiety—i.e., with this polar linkage forming moiety attached to one terminal C atom of the corresponding hydrocarbyl block, and thereby terminating one end of the linear precursor. Also suitable as precursors are linear hydrocarbons with two polar linkage forming moieties, both of which are terminating moieties—i.e., having one of the terminating polar linkage forming moieties attached at either terminal C atom of the corresponding hydrocarbyl block, and thereby terminating both ends of the linear precursor.

As to polyethylene precursors in particular, suitable examples include those which are solid at 25° C., but liquid at operating temperatures, particularly fusing process temperatures.

A commercially available hydrocarbon suitable for use as a precursor is Unicid®700, a carboxy functional hydrocarbon from Baker Petrolite, Sand Springs, Okla.

Perhalopolyether blocks of the invention include linear blocks and branched blocks. Perhalopolyether blocks include homopolymer blocks and copolymer blocks of perhalocarboxy monomeric units.

Suitable perhalocarboxy monomeric units include $C_1$ and greater perhalocarboxy monomeric units, especially $C_1$ and greater perhaloalkoxy monomeric units, with the $C_1$–$C_{10}$ perhalocarboxy monomeric units, and especially the $C_1$–$C_{10}$ perhaloalkoxy monomeric units, being particularly preferred. Particular monomeric units that may be used include the perfluoromethoxy ($-OCF_2-$), perfluoroethoxy ($-OCF_2CF_2-$), perfluoropropoxy ($-OCF_2CF_2CF_2-$), perfluoroisopropoxy ($-OCF(CF_3)CF_2-$), perfluorobutoxy ($-OCF_2CF_2CF_2CF_2-$), perfluorosecbutoxy ($-OCF(CF_3)CF_2CF_2-$), and perfluoroisobutoxy ($-OCF_2C(CF_3)_2-$) monomeric units.

Like the indicated fluorocarbyl blocks, perfluoropolyether blocks improve the wetting—by polymers of the invention—of fuser member surfaces which themselves include fluorine substituents.

Perhalopolyether blocks and precursors of the invention preferably have a molecular weight of from about 200 to about 12,000. More preferably, perhalopolyether blocks and precursors of the invention have a molecular weight of from about 400 to about 8,000, and still more preferably of from about 600 to about 4,000.

Suitable perhalopolyether precursors include linear perhalopolyether precursors having one or two polar linkage forming moieties. Branched perhalopolyether precursors having one polar linkage forming moiety, and branched perhalopolyether precursors having two or more polar linkage forming moieties, also may be used.

Particularly as to linear perhalopolyether precursors, those that may be used include linear perhalopolyethers having a single polar linkage forming moiety which is a terminating moiety—i.e., with this polar linkage forming moiety attached to one terminal perhalocarboxy unit of the corresponding perhalopolyether block, and thereby terminating one end of the linear precursor. Also suitable as precursors are linear perhalopolyethers with two polar linkage forming moieties, both of which are terminating moieties—i.e., having one of the terminating polar linkage forming moieties attached at either terminal perhalocarboxy unit of the corresponding perhalopolyether block, and thereby terminating both ends of the linear precursor.

As to the foregoing, terminating moieties preferably are attached particularly to terminal C atoms of perhalopolyether blocks—e.g., to perhalomethylene, particularly ($-CF_2-$), units. Further, terminal perhalocarboxy units that do not have attached polar linkage forming moieties can have suitable endcaps, or attached terminal groups. Among the groups suitable for this purpose are perhalomethyl, particularly ($-CF_3$), groups.

Commercially available perfluoropolyethers that are suitable precursors include the following, all from Ausimont USA, Inc., Thorofare, N.J.: Fombline® Z-Diac, which is a dicarboxy functional perfluoropolyether, having two carboxyl groups, one terminating each end of the perfluoropolyether; Fomblin® MF-300, which is a monocarboxy functional perfluoropolyether, with a single carboxyl group terminating one end of the perfluoropolyether; and Fomblin® Z-Diol, which is a dihydroxy functional perfluoropolyether, having two hydroxyl groups, one terminating each end of the perfluoropolyether.

The totality of the polyorganosiloxane blocks—i.e., the one or more polyorganosiloxane blocks—of the polymer of the invention, is referred to as the polyorganosiloxane component of the polymer. Correspondingly, the totality of the organomer blocks is referred to as the organomer component.

The organomer component can be a hydrocarbyl component—i.e., with all of the one or more organomer blocks being hydrocarbyl blocks—or it can be a perhalopolyether component—i.e., with all of the one or more organomer blocks being perhalopolyether blocks—or it can include both one or more hydrocarbyl blocks and one or more perhalopolyether blocks.

The polymer of the invention accordingly can comprise a hydrocarbyl component and/or a perhalopolyether component. And, for instance, the hydrocarbyl component can comprise a halocarbyl component.

Discussion concerning organomer components applies to hydrocarbyl components and to perhalopolyether components.

Preferably the polyorganosiloxane component has a greater molecular weight than the organomer component. In this regard, the polyorganosiloxane component can be in the form of a single polyorganosiloxane block having a molecular weight greater than that of a single organomer block or the sum of multiple organomer block molecular weights, or the polyorganosiloxane component can be in the form of multiple polyorganosiloxane blocks having a total molecular weight greater than that of a single organomer block or the sum of multiple organomer block molecular weights.

Also as a matter of preference, the polyorganosiloxane component comprises a majority of the polymer of the invention. Here, a majority means that the molecular weight of the polyorganosiloxane component comprises more than 50 percent of the molecular weight of the polymer.

As a matter of particular preference, the polymer of the invention is predominantly polyorganosiloxane—i.e., the polyorganosiloxane component is predominant. This predominance refers to the molecular weight of the polyorganosiloxane component comprising at least 75 percent of the molecular weight of the polymer.

As to the relative sizes of the polyorganosiloxane and organomer blocks in a polymer of the invention, preferably the polyorganosiloxane block molecular weight is greater than the organomer block molecular weight. In the case of hydrocarbyl blocks, the mole ratio of polyorganosiloxane block Si atoms to hydrocarbyl block C atoms preferably is greater than about 1:3; this ratio more preferably is from about 1:1 to about 40:1, still more preferably from about 1:1.5 to about 30:1, and still more preferably from about 2:1 to about 20:1—particularly in the case of polydimethylsiloxane blocks (i.e., with dimethylsiloxy units) and alkyl blocks (i.e., having methylene units).

Further as to this matter, particularly in the case of halocarbyl blocks, and most especially fluorocarbyl blocks, the mole ratio preferably is greater than about 1:1; this ratio more preferably is from about 1:1 to about 40:1, still more preferably from about 2:1 to about 140:1, and still more preferably from about 3:1 to about 100:1, and still more preferably from about 4:1 to about 70:1. And particularly in the case of perhalopolyether blocks, and most especially perfluoropolyether blocks, the mole ratio of polyorganosiloxane block Si atoms to perhalopolyether block C atoms preferably is greater than about 1:3; this ratio more preferably is from about 1:1 to about 140:1, still more preferably from about 1.5:1 to about 100:1, and still more preferably from about 2:1 to about 70:1.

Additionally in the case particularly of polydimethylsiloxane and alkyl blocks, preferably the polydimethylsiloxane block to alkyl block molecular weight ratio is from about 5:1 to about 400:1, more preferably from about 8:1 to about 100:1, still more preferably from about 12:1 to about 55:1, still more preferably from about 15:1 to about 30:1. Particularly with polydimethylsiloxane and fluoroalkyl blocks, preferably the polydimethylsiloxane block to fluoroalkyl block molecular weight ratio is from about 5:1 to about 400:1, more preferably from about 7:1 to about 150:1, still more preferably from about 9:1 to about 75:1, still more preferably from about 11:1 to about 40:1.

As to using polymers of the invention—particularly, using these polymers in toner fusing processes—it is believed that the polyorganosiloxane blocks, the hydrocarbyl blocks, the perhalopolyether blocks, and the polar functionalities thereof all have advantageous effects, in facilitating the combating of toner offset and toner buildup on fuser members.

In this regard, the hydrocarbyl blocks are thought to exhibit surfactant-like behavior, and to interact with nonpolar surfaces, like the fusing process toner. Waxy hydrocarbyl blocks, by virtue of their waxy nature, lubricate toner, and allow it to peel from surfaces without offset.

The polyorganosiloxane blocks likewise are thought to exhibit surfactant-like behavior. Where polymer of the invention is employed with polyorganosiloxane release agent—e.g., as part of a release agent composition—the polyorganosiloxane blocks are further thought to promote wetting of the surfaces by the release agent.

This is particularly the case where polyorganosiloxane release agent, as discussed, comprises about 50 percent by weight or more, and even 75 percent by weight or more, of the composition. In such instance, even where polymer of the invention comprises a comparatively minor portion by weight of the release agent composition, it promotes wetting of fuser member surfaces by the composition; and this is especially the case where the organomer component—of the polymer of the invention—comprises a fluorocarbyl block and/or a perfluoropolyether block, and most especially where, yet additionally, the fuser member surface to which the composition is applied is fluorinated, or includes fluorine substituents—e.g., comprises polyfluorocarbon, or is provided by a polyfluorocarbon fusing surface layer. With respect to the foregoing, silicones—polyorganosiloxanes—are known in the art to be particularly useful as release agents, and the polyorganosiloxane block further promotes release of the toner from surfaces without offset.

And yet additionally with regard to employing the polymer of the invention—as indicated—with polyorganosiloxane release agent, and with the organomer component comprising a fluorocarbon and/or perfluoropolyether block or blocks, the polyorganosiloxane block or blocks, by their covalent bonding with the fluorine-containing organomer component, stabilize this component. In this regard, ordinarily fluorine-containing materials do not blend or mix well with nonfluorine-containing materials. However, because of this stabilization, separation of the fluorocarbon and/or perfluoropolyether from the composition is minimized.

The polar functionalities are thought to interact with polar sites, or high energy sites, on the toner and/or on the fuser member. These sites include exposed fusing surface layer fillers, like metal oxides, and contaminants, such as paper debris. Because the polar functionality is at the linkage between the polyorganosiloxane and organomer blocks, either type of block may bring it to a surface to attach to a polar or high energy site, and participate in shielding the site. The polyorganosiloxane and organomer blocks serve to effect coating, and prevent adhesion to other surfaces.

A block polyorganosiloxane block organomer polymer of the invention can be prepared by reacting together at least one polyorganosiloxane precursor and at least one organomer precursor. In the reaction of polyorganosiloxane and organomer precursors, first and second polar linkage forming moieties form polar linkages, and first and second polar functionality forming groups form polar functionalities, as discussed.

The amide polar functionality can be obtained by reaction of a primary amine polar functionality forming group (i.e., —$NH_2$)—particularly an amidization reactive primary amine polar functionality forming group—with a carboxyl or acid chloride polar functionality forming group (i.e., —COOH or —COOCL)—particularly an amidization reactive carboxyl or acid chloride polar functionality forming group. Accordingly, the first polar linkage forming moieties (i.e., the polyorganosiloxane precursor moieties) can comprise one of primary amino functional groups and carboxy functional groups, and the second polar linkage forming moieties (i.e., the organomer precursor moieties) can comprise the other. Or the first polar linkage forming moieties (i.e., the polyorganosiloxane precursor moieties) can comprise one of primary amino functional groups and acid chloride functional groups, and the second polar linkage forming moieties (i.e., the organomer precursor moieties) can comprise the other.

Therefore, as one possibility, a primary amino functional polyorganosiloxane and a carboxy functional organomer can be reacted to provide a block polyorganosiloxane block organomer polymer of the invention. Other possible combinations that can be utilized for this reaction are: primary amino functional polyorganosiloxane/acid chloride functional organomer; carboxy functional polyorganosiloxane/primary amino functional organomer; and acid chloride functional polyorganosiloxane/primary amino functional organomer.

The foregoing also applies to reacting a primary amine polar functionality forming group with an isocyanate polar functionality forming group (i.e., —N═C═O) to provide the urea polar functionality, and to reacting a hydroxyl polar functionality forming group (i.e., —OH) with an isocyanate polar functionality forming group to provide the urethane polar functionality.

In a method of preparing amide polar functionality polymers of the invention—from primary amino functional and carboxy or acid chloride functional polyorganosiloxanes and organomers, such as hydrocarbons, including fluorocarbons, and perfluoropolyethers—the precursors are added together, and brought to a temperature sufficient to place all of the precursors, both polyorganosiloxane and organomer precursors, in a liquid state. If all of the precursors are liquid at ambient temperature, then heating is not necessary at this point; otherwise, heating is effected to raise the temperature sufficiently so as to melt all solid precursor or precursors. Once the reactants are in the liquid state, they are suitably blended, or mixed, preferably to a uniform composition.

Particularly where carboxy functional precursors are employed, the temperature is elevated to the point required for effecting reaction of the primary amine and carboxyl functionalities, and for causing formation of the corresponding amide polar functionality by the elimination of water. Specifically, the mixture is brought to a temperature of at least about 80° C., more preferably at least about 100° C. Particularly, the reaction temperature is preferably from about 100° C. to about 200° C., more preferably from about 110° C. to about 175° C., and still more preferably from about 120° C. to about 160° C.

The mixture is maintained at the reaction temperature for a time sufficient to permit the indicated amidization. The amount of time required depends on, inter alia, the temperature, and the identity of the reactants.

For instance, at reaction times of from about 30 minutes to about 6 hours, temperatures of from about 130° C. to about 150° C. are employed. Longer reaction periods may be required for lower temperatures, and shorter periods for higher temperatures.

During reaction at elevated temperatures, preferably the mixture is continuously blended or mixed. However, this treatment is not required beyond what is necessary to obtain a uniform composition.

In contrast to carboxy functional precursors, with the acid chlorides the temperature need only be high enough so that all the precursors are in the liquid state, in order for amidization readily to proceed. However, heating to a higher temperature may be employed to accelerate the reaction. Particularly, preferably the mixture is heated at a temperature of from about 30° C., or about 60° C., to about 150° C., or about 200° C. In any event, with acid chloride functional precursors, the indicated mixing of reactants in the liquid state is continued until the amidization is complete, or at least essentially complete.

With both carboxy and acid chloride functional precursors, the reaction may be conducted in the ambient air, such as in an open kettle, or in a closed system, provided there are means for removing evolved water (in the case of carboxy functional precursors) or HCl (for acid chloride functional precursors). Water or HCl removal may be done with a nitrogen sweep, or by vacuum.

Preparing the amide polar functionality polymers, from primary amino functional and carboxy or acid chloride functional polyorganosiloxanes and organomers, is comparatively simple, because of the interaction of the primary amino functional and carboxy functional groups, and the interaction of the primary amino functional and acid chloride functional groups. In this regard, mixing between the precursors is facilitated by the miscibility of these groups, thereby enhancing ease of preparation.

And this advantage is of particular value with fluorocarbon and perfluoropolyether precursors. Normally, reacting fluorine containing materials with nonfluorine containing materials is difficult, because—as discussed—the former do not blend or mix well with the latter. Therefore, to achieve the desired reaction, it is often necessary to use extreme measures, such as employing exotic solvents that will solubilize both the fluorine and nonfluorine reactants. However, where it is the indicated $NH_2/COOH$ or $NH_2/COOCl$ functional precursor combinations that are employed, then because of the indicated interaction and improved mixing that characterizes the acyl and base functional reactants, the precursors readily blend together and react—whether the fluorocarbon and/or the perfluoropolyether are acyl or primary amino functional.

Urea polar functionality polymers of the invention can be prepared from primary amino functional and isocyanate functional polyorganosiloxanes and organomers, in accordance with recognized synthetic pathways for primary amine and isocyanate reactants. Likewise, urethane polar functionality polymers of the invention can be prepared from hydroxy functional and isocyanate functional polyorganosiloxanes and organomers, in accordance with recognized synthetic pathways for hydroxyl and isocyanate reactants.

For both the urea and the urethane polymer preparation, the reactants are combined, and brought to a temperature sufficient to place all the precursors in a liquid state. If all of the precursors are liquid at ambient temperature, then heating is not necessary; otherwise, heating is effected to raise the temperature sufficiently so as to melt all solid precursor or precursors. Once the reactants are in the liquid state, they are suitably blended, or mixed.

As where acid chloride precursors are used for preparing the amide functional polymers, the reaction will occur where the temperature is high enough so that the precursors are all in the liquid state. However, here too heating to higher temperatures may be used to accelerate the reaction. Preferably both urea and urethane preparation are conducted at temperatures of from about 30° C. to about 150° C. Mixing of the liquid state reactants is continued until the reaction is complete, or at least essentially complete.

In preparing the urea polar functionality polymer, it may be necessary to take precautions for removal of water to prevent loss of the isocyanate functionality—for instance, by purging with dry air or nitrogen. Precautions for the removal of water may also be necessary for urethane polymer preparation.

Yet additionally, a catalyst may be employed in both urea and urethane polymer preparation. A suitable catalyst for each of these polymerizations is triethylenediamine.

Particularly with respect to polar linkage forming moieties, those that have amidization reactive primary amine groups, as their polar functionality forming groups, can be characterized as primary amino functional polar linkage forming moieties. Correspondingly, polar linkage forming moieties that have amidization reactive carboxyl groups—or acid chloride groups, or hydroxyl groups, or isocyanate groups—as their polar functionality forming groups, can be characterized as carboxy functional—or acid chloride functional, or hydroxy functional, or isocyanate functional—polar linkage forming moieties.

Suitable primary amino functional—and carboxy functional, and acid chloride functional, and hydroxy functional, and isocyanate functional—polar linkage forming moieties include primary aminohydrocarbyl—and carboxyhydrocarbyl, and acylchlorohydrocarbyl, and hydroxyhydrocarbyl, and isocyanatehydrocarbyl—groups, especially the primary aminoalkyl—and carboxyalkyl, and acylchloroalkyl, and hydroxyalkyl, and isocyanatealkyl—groups. As to these, the primary amino—and carboxy, and acid chloride, and hydroxy, and isocyanate—$C_1$ and greater hydrocarbyl groups, and especially the primary amino—and carboxy, and acid chloride, and hydroxy, and isocyanate—$C_1$ and greater alkyl groups, are preferred, with the primary amino—and carboxy, and acid chloride, and hydroxy, and isocyanate —$C_1$–$C_{10}$ hydrocarbyl groups, and especially the primary amino—and carboxy, and acid chloride, and hydroxy, and isocyanate —$C_1$–$C_{10}$ alkyl groups, being particularly preferred, and the primary amino—and carboxy, and acid chloride, and hydroxy, and isocyanate —$C_1$ and greater n-alkyl groups, especially 3-aminopropyl ($H_2NCH_2CH_2CH_2$—)—and 3-carboxypropyl (HOOC—$CH_2CH_2CH_2$—), and 3-acylchloropropyl (ClOOCCH$_2$CH$_2$CH$_2$—), and 3-hydroxypropyl (HOCH$_2$CH$_2$CH$_2$—), and 3-isocyanatepropyl (OCN—CH$_2$CH$_2$CH$_2$—)—being most preferred.

And regarding the polyorganosiloxane precursors in particular, preferably their polar linkage forming moieties have at least three carbon atoms—especially, three methylene units—separating the polar functionality forming group from the polyorganosiloxane block. Accordingly, as to the first polar linkage forming moieties of the invention, preferred primary amino—and carboxy, and acid chloride, and hydroxy, and isocyanate—functional moieties are the primary amino—and carboxy, and acid chloride, and hydroxy, and isocyanate—$C_3$ and greater hydrocarbyl groups, and especially the primary amino—and carboxy, and acid chloride, and hydroxy, and isocyanate—$C_3$ and greater alkyl groups, with the primary amino—and carboxy, and acid chloride, and hydroxy, and isocyanate—$C_3$–$C_{10}$ hydrocarbyl groups, and especially the primary amino—and carboxy, and acid chloride, and hydroxy, and isocyanate—$C_3$–$C_{10}$ alkyl groups, being particularly preferred, and the primary amino—and carboxy, and acid chloride, and hydroxy, and isocyanate—$C_3$ and greater (such as $C_3$–$C_{10}$) n-alkyl groups, especially 3-aminopropyl ($H_2NCH_2CH_2CH_2$—)—and 3-carboxypropyl (HOOC—CH$_2$CH$_2$CH$_2$—), and 3-acylchloropropyl (ClOOC—CH$_2$CH$_2$CH$_2$—), and 3-hydroxypropyl (HOCH$_2$CH$_2$CH$_2$—), and 3-isocyanatepropyl (OCNCH$_2$CH$_2$CH$_2$—)—being most preferred.

Additional preferred first polar linkage forming moieties, particularly for the branched polyorganosiloxane precursors having the formula $X-(D^3)_e-[(D^4)_f\text{-ran-}(T)_g]$, as discussed herein, are those comprising carboxy, as well as acid chloride, and primary amino, functional first moieties having the formula

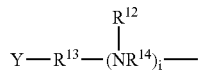

wherein
R$^{12}$ selected from the group consisting of the H atom and C$_1$–C$_{10}$ hydrocarbyl groups;
R$^{13}$ and R$^{14}$ are the same or different, and are selected from the group consisting of C$_1$–C$_{10}$ hydrocarbyl groups;
Y is selected from the group consisting H$_2$N—, ClOOC—, and HOOC—; and
i is 0 to 5.

Functional groups disclosed in U.S. Provisional Application No. 60/305,874, and identified therein by the variable X, are suitable as first polar linkage forming moieties for the present invention.

Specifically regarding primary amino functional polyorganosiloxanes, polysiloxanes disclosed in U.S. Pat. Nos. 5,489,482, 5,512,409, 5,516,361, 5,531,813, and 5,925,779—these patents being incorporated herein in their entireties, by reference thereto—are suitable polyorganosiloxane precursors for the present invention. Further, the processes disclosed in these patents may be used to prepare polyorganosiloxane precursors for the present invention.

Yet further as to both primary amino functional and carboxy functional polyorganosiloxane precursors, polydimethylsiloxanes which may be used include α-aminopropyldimethylsiloxy, ω-trimethylsiloxy terminated polydimethylsiloxanes, α,ω-aminopropyldimethylsiloxy terminated polydimethylsiloxanes, α-carboxypropyldimethylsiloxy, ω-trimethylsiloxy terminated polydimethylsiloxanes, and α,ω-carboxypropyldimethylsiloxy terminated polydimethylsiloxanes. These primary amino functional and carboxy functional polydimethylsiloxane precursors preferably have a molecular weight of from about 4,000 to about 120,000, more preferably of from about 6,000 to about 60,000, and still more preferably of from about 8,000 to about 40,000. Commercially available polydimethylsiloxanes that may be used as precursors include PS513 and PS510 α,ω-aminopropyldimethylsiloxy terminated polydimethylsiloxanes, and PS563 α,ω-carboxypropyldimethylsiloxy terminated polydimethylsiloxane, from United Chemical Technologies, Inc., Bristol, Pa.

Further regarding carboxy functional hydrocarbon precursors, those that are suitable include the fatty acids, such as the C$_4$–C$_{30}$, and preferably the C$_{12}$–C$_{24}$ fatty acids. The saturated, monounsaturated, and polyunsaturated fatty acids may be used, with saturated being preferred.

Particularly as to the saturated, monounsaturated, and polyunsaturated fatty acids, those with a single carboxyl group at one end of the chain are preferred. Of these, especially preferred are the saturated monocarboxylic fatty acids, with the most preferred being those having the formula $H_3C(CH_2)_n COOH$ wherein n is 4 to 28.

Also preferred are the saturated, monounsaturated, and polyunsaturated fatty acids with two carboxyl groups, one at each end of the chain. Of these, particularly preferred are the saturated dicarboxylic fatty acids, with the most preferred being those having the formula $HOOC(CH_2)_n COOH$ wherein n is 4 to 28.

Also suitable are the acid chloride forms of the foregoing fatty acids.

Particular fatty acids that may be used include lauric acid, stearic acid, eicosanoic acid, docosanoic acid, tetracosanoic acid, and tricontanoic acid. Particular acid chlorides that may be used are the corresponding acid chloride forms of these fatty acids.

As to the perfluoroalkanoic, or perfluorocarboxylic acids, the saturated monocarboxylic acids, with the single carboxyl group at one end of the chain, are preferred. Particularly preferred are those having the formula $F_3C(CF_2)_n COOH$ wherein n is 4 to 28.

Further preferred of the perfluoroalkanoic acids are the saturated dicarboxylic acids, with one of the two carboxyl groups at each end of the chain. Especially preferred are those having the formula $HOOC(CF_2)_n COOH$ wherein n is 4 to 28.

Also suitable are the acid chloride forms of the foregoing the perfluoroalkanoic, or perfluorocarboxylic acids. Particularly preferred are the acid chloride forms of the saturated monocarboxylic acids, with the single carboxyl group at one end of the chain.

Particular perfluoroalkanoic acids that may be used include perfluorotetradecanoic acid and perfluorodecanoic acid. Particular acid chlorides that may be used are the corresponding acid chloride forms of these perfluoroalkanoic acids.

Further regarding isocyanate functional hydrocarbon precursors, those that are suitable include C$_4$–C$_{30}$, and preferably the C$_{12}$–C$_{24}$ isocyanate functional hydrocarbon precursors. The saturated, monounsaturated, and polyunsaturated isocyanate functional hydrocarbon precursors may be used, with saturated being preferred.

Particularly as to the saturated, monounsaturated, and polyunsaturated isocyanate functional hydrocarbon precursors, those with a single isocyanate group at one end of the chain are preferred. Of these, especially preferred are the saturated monoisocyanate hydrocarbons, with the most preferred being those having the formula $H_3C(CH_2)_n NCO$ wherein n is 4 to 28.

It is advantageous that release agent compositions of the invention be free, or at least essentially free, of free amine groups, particularly free primary amine groups. It is correspondingly advantageous that block polyorganosiloxane block organomer polymers of the invention be free, or at least essentially free, of free amine groups, particularly free primary amine groups.

Further, where primary amino functional precursors are used to prepare the polymers of the invention, it is preferred, when the preparation process is complete, that there are no remaining, or at least essentially no remaining, unreacted primary amino functional polar linkage forming moieties; there are no remaining, or at least essentially no remaining, unreacted primary amine polar functionality forming groups. It is also preferred that the process of preparation leaves no remaining free primary amino functional precursors, or at least essentially no remaining free primary amino functional precursors.

It is even more advantageous that release agent compositions of the invention be free, or at least essentially free, of free isocyanate groups. It is correspondingly even more advantageous that block polyorganosiloxane block organomer polymers of the invention be free, or at least essentially free, of free isocyanate groups.

Further, where isocyanate functional precursors are used to prepare the polymers of the invention, it is even more preferred, when the preparation process is complete, that there are no remaining, or at least essentially no remaining, unreacted isocyanate functional polar linkage forming moieties; there are no remaining, or at least essentially no remaining, unreacted isocyanate polar functionality forming groups. It is also even more preferred that the process of preparation leaves no remaining free isocyanate functional precursors, or at least essentially no remaining free isocyanate functional precursors.

Accordingly, where primary amino functional and carboxy or acid chloride functional polyorganosiloxane and organomer precursors are used to prepare polymers of the invention, preferably an excess of polar functionality forming carboxyl or acid chloride groups, over polar functionality forming primary amine groups, is used—particularly, preferably the ratio of carboxy or acid chloride functional polar linkage forming moieties, to primary amino functional polar linkage forming moieties, is greater than 1:1. As a matter of particular preference, this ratio is sufficiently greater than 1:1 so that the resulting block polyorganosiloxane block organomer polymer is free, or at least essentially free, of free amine groups, particularly free primary amine groups. Also, as a matter of particular preference, the indicated ratio is sufficiently greater than 1:1 so that, when the preparation process is complete, there are no remaining, or at least essentially no remaining, unreacted primary amino functional polar linkage forming moieties. Yet additionally as a matter of particular preference, the indicated ratio is sufficiently greater than 1:1 so that the process of preparation leaves no remaining free primary amino functional precursors, or at least essentially no remaining free primary amino functional precursors.

The discussion concerning the ratio, of carboxy or acid chloride functional polar linkage forming moieties to primary amino functional polar linkage forming moieties, pertains to the ratio, of carboxyl or acid chloride polar functionality forming groups to primary amine polar functionality forming groups.

Correspondingly, where isocyanate functional and hydroxy functional polyorganosiloxane and organomer precursors are used to prepare polymers of the invention, preferably an excess of polar functionality forming hydroxyl groups, over polar functionality forming isocyanate groups, is used—particularly, preferably the ratio of hydroxy functional polar linkage forming moieties, to isocyanate functional polar linkage forming moieties, is greater than 1:1. As a matter of particular preference, this ratio is sufficiently greater than 1:1 so that the resulting block polyorganosiloxane block organomer polymer is free, or at least essentially free, of free isocyanate groups. Also, as a matter of particular preference, the indicated ratio is sufficiently greater than 1:1 so that, when the preparation process is complete, there are no remaining, or at least essentially no remaining, unreacted isocyanate functional polar linkage forming moieties. Yet additionally as a matter of particular preference, the indicated ratio is sufficiently greater than 1:1 so that the process of preparation leaves no remaining free isocyanate functional precursors, or at least essentially no remaining free isocyanate functional precursors.

The discussion concerning the ratio, of isocyanate functional polar linkage forming moieties to hydroxy functional polar linkage forming moieties, pertains to the ratio, of isocyanate polar functionality forming groups to hydroxyl polar functionality forming groups.

However, where isocyanate functional and primary amino functional polyorganosiloxane and organomer precursors are used to prepare polymers of the invention, ideally the relative proportions of polar functionality forming isocyanate and primary amine groups are such that, when the preparation process is complete, there are no remaining, or at least essentially no remaining, unreacted isocyanate and primary amino functional polar linkage forming moieties; there are no remaining, or at least essentially no remaining, unreacted isocyanate polar functionality forming groups and primary amine polar functionality forming groups. Also ideally, the relative proportions of polar functionality forming isocyanate and amine groups is such that, when the preparation process is complete, there are no remaining free isocyanate and primary amino functional precursors, or at least essentially no remaining free isocyanate and primary amino functional precursors.

Nevertheless, where this ideal cannot be realized, then because unreacted isocyanate remaining after preparation is even less desirable than unreacted amine, preferably the relative proportions of polar functionality forming isocyanate and primary amine groups are such that, when the preparation process is complete, there are no remaining, or at least essentially no remaining, unreacted isocyanate moieties, and no remaining, or at least essentially no remaining, free isocyanate precursors, with the amount of unreacted primary amine moieties, and the amount of free primary amine precursors, being minimized.

And where the indicated ideal cannot be realized, then whether or not the amount of unreacted primary amine moieties and free primary amine precursors indeed can be minimized, nevertheless preferably the ratio of primary amino functional polar linkage forming moieties, to isocyanate functional polar linkage forming moieties, is sufficiently greater than 1:1, so that the resulting block polyorganosiloxane block organomer polymer is free, or at least essentially free, of free isocyanate groups. Also, as a matter of preference, the indicated ratio is sufficiently greater than 1:1 so that, when the preparation process is complete, there are no remaining, or at least essentially no remaining, unreacted isocyanate functional polar linkage forming moieties. Yet additionally as a matter of particular preference, the indicated ratio is sufficiently greater than 1:1 so that the process of preparation leaves no remaining free isocyanate functional precursors, or at least essentially no remaining free isocyanate functional precursors.

The discussion concerning the ratio, of primary amino functional polar linkage forming moieties to isocyanate functional polar linkage forming moieties, pertains to the ratio, of primary amino polar functionality forming groups to isocyanate polar functionality forming groups.

Block polyorganosiloxane block organomer polymers of the invention preferably have a viscosity of from about 10 cSt to about 200,000 cSt at use temperatures. Accordingly, a polymer of the invention may be solid at 25° C.—i.e., ambient, or room, temperature—but liquid at the fusing temperature, or at the temperature of its delivery system during operation of the toner fusing system.

Also as a matter of preference, the block polyorganosiloxane block organomer polymers of the invention are thermally stable up to a temperature of at least about 120° C.—more preferably of at least about 130° C., and still more preferably of at least about 150° C. It is understood that thermal stability entails the absence, or at least the essential absence or substantial absence, of degradation, decomposition, and release of byproducts.

The release agent of the invention is, or consists of, or consists essentially of, or consists substantially of, or comprises, one or more of the block polyorganosiloxane block organomer polymers of the invention. In this regard, polymers of the invention have utility as release agents or release agent compositions, or as additives, or components, or ingredients—particularly, as active ingredients—in release agents or release agent compositions.

Particularly, polymers of the invention can be used neat, or together with one or more other components or ingredients. For example, in addition to one or more polymers of the invention, the release agent composition can comprise one or more release agents, especially one or more polymeric release agents.

Among the foregoing release agents are polyorganosiloxane release agents; polyorganosiloxanes which may be used include those endcapped by trimethylsiloxy groups. Also suitable are hydrocarbon release agents, particularly polyethylene release agents, and perhalopolyether release agents; perhalopolyethers which may be used include those endcapped by perhalomethyl units.

Polymers of the invention comprising a hydrocarbyl component are particularly suitable for use with hydrocarbon release agents. Correspondingly, polymers of the invention comprising perhalopolyether or polyorganosiloxane components are particularly suitable for use with perhalopolyether or polyorganosiloxane release agents, respectively.

Hydrocarbon release agents which may be used include polyethylenes, such as those that are solid at 25° C., but liquid at operating temperatures, particularly fusing process temperatures. Preferred polyethylenes are those having a molecular weight of from about 300 to about 10,000.

Perhalopolyether release agents which may be used include perhalopolyether homopolymers and copolymers comprising perhalocarboxy monomeric units as discussed. Perhalopolyethers which may be used include those endcapped by perhalomethyl groups.

Commercially available perfluoropolyethers that are suitable for use as release agents include the following: Krytox, from E.I. du Pont de Nemours and Company, Deepwater, N.J.; Fomblin® Y45, YR, and YPL1500, from Ausimont USA, Inc.; and Galden® HT230, HT250, HT270, also from Ausimont USA, Inc.

Though perfluoropolyethers as indicated indeed are suitable as release agents, their use for this purpose is not preferred, due to cost considerations. Halocarbons also are not preferred for the same reason, though these are among the hydrocarbons which can be used as release agents.

Suitable polyorganosiloxanes include polyorganosiloxane fluids, such as oils and liquids—particularly those that are oils and liquids at 25° C. Polyorganosiloxanes that can be used also include those that are solid at 25° C., but liquid at operating temperatures, particularly fusing process temperatures. In this regard, it is understood that the use of release agents that are solid at ambient temperatures but liquid under use conditions require specialized delivery systems, as are known in the art.

Preferred polyorganosiloxanes are those that are liquid at fusing process temperatures, and more preferably have an ambient temperature viscosity of from about 100 centistokes to about 500 centistokes or to about 100,000 centistokes, still more preferably from about 350 centistokes to about 100,000 centistokes, or from about 500 or 501 centistokes to about 70,000 centistokes, or from about 10,000 centistokes to about 80,000 centistokes, or from about 10,000 centistokes to about 100,000 centistokes, with the viscosity dropping at the elevated temperatures employed in the fusing process. Where polyorganosiloxane viscosity is discussed without indication of whether the ambient temperature liquids or solids are intended, then it is understood that in the case of the liquids the viscosity is ambient temperature viscosity, while for solids it is viscosity at operating temperatures, particularly fusing process temperatures.

Of the polyorganosiloxanes, the nonfunctional polyorganosiloxanes, particularly the nonfunctional polydimethylsiloxanes, are preferred. Commercially available non-functional polydimethylsiloxanes which may be used are the DC200® polydimethylsiloxanes, from Dow Corning Corporation, Midland, Mich.

Functional polyorganosiloxanes also may be used. One reason for employing functional polyorganosiloxanes is to enhance interaction of the release agent with the fuser member surface, or with material such as filler incorporated therein.

Particular functional polyorganosiloxanes which may be used include those disclosed in U.S. Pat. Nos. 4,011,362, 4,046,795, and 4,264,181; these patents also are incorporated herein in their entireties, by reference thereto. Still further functional polyorganosiloxanes which may be used are the mercapto functional polyorganosiloxanes, such as those disclosed in U.S. Pat. No. 4,029,827, and the polyorganosiloxanes having functional groups such as carboxy, hydroxy, epoxy, amino, isocyanate, thioether, and (as indicated) mercapto functional groups, such as those disclosed in U.S. Pat. Nos. 4,101,686 and 4,185,140; yet additionally these patents are incorporated herein in their entireties, by reference thereto.

Suitable functional polyorganosiloxanes include those with one or more pendant functional groups and/or one or two terminating functional groups—it also being understood that pendant groups are side groups, or moieties attached along the backbone of the polymer chain, to monomeric units that are not terminal monomeric units of the chain (i.e., that are nonterminal monomeric units thereof), and terminating groups are end groups, or moieties attached on the backbone of the polymer chain to terminal monomeric units at the polymer chain ends. Particularly preferred functional polyorganosiloxanes are the monofunctional polyorganosiloxanes—these being polyorganosiloxanes having one functional group per molecule or polymer chain. Suitable monofunctional polyorganosiloxanes include those wherein the sole functional group is a side group; however, the preferred monofunctional polyorganosiloxanes are those which are functional group terminated—i.e., wherein the sole functional group is at an end of the polymer chain.

The more preferred release agents with functional groups are the mercapto functional polyorganosiloxane release agents and the amino functional polyorganosiloxane release agents. Particularly preferred are the release agents, including mecapto functional polyorganosiloxane release agents, consisting of, consisting essentially of, consisting substantially of, or comprising monomercapto functional polyorganosiloxanes, or polyorganosiloxanes having one mercapto functional group per molecule or polymer chain. Also particularly preferred are release agents, including amino functional polyorganosiloxane release agents, consisting of, consisting essentially of, consisting substantially of, or comprising monoamino functional polyorganosiloxanes, or polyorganosiloxanes having one amino functional group per molecule or polymer chain. In this regard, the release agents disclosed in U.S. Pat. Nos. 5,531,813 and 6,011,946 may be used; these patents are incorporated herein in their entireties, by reference thereto.

The release agent accordingly can comprise, in addition to one or more block polyorganosiloxane block organomer polymers of the invention, one or more non-functional polyorganosiloxanes, and/or one or more functional polyorganosiloxanes. The release agent can be a blend or mixture of the indicated components, and can be employed in the form of a blend or mixture, or these components can be used separately in the toner fusing process of the invention. Where nonfunctional polyorganosiloxane is included, it can serve as a diluent for polymer of the invention and for functional polyorganosiloxane (if included), so as to lessen the release agent expense.

With reference to the blends and mixtures, the presence of the polyorganosiloxane component, as part of the polymer of the invention, promotes dispersal of the polymer in the one or more nonfunctional and/or functional polyorganosiloxanes, and stabilizes the polymer, thereby combating (e.g., preventing or at least inhibiting) settling—particularly where the polymer of the invention serves as an additive. Without this polyorganosiloxane component, hydrocarbons, particularly waxy hydrocarbons, that are added to or combined with silicone or polyorganosiloxane liquids and oils, will tend to phase separate or precipitate. This will occur at ambient temperatures and at elevated temperatures; however, the tendency is particularly evident with cooling compositions.

In the release agent blends and mixtures, preferably the block polyorganosiloxane block organomer polymer of the invention is predominantly polyorganosiloxane—i.e., as a matter of preference, the polyorganosiloxane component of the polymer is predominant. Because of this predominance, the polymer of the invention more easily disperses in the one or more nonfunctional and/or functional polyorganosiloxanes, and thusly disperses more easily therein as an additive.

Where a release agent blend or mixture includes a nonfunctional polyorganosiloxane, and where the polymer of the invention comprises not more than 50 percent by volume of the blend or mixture, then preferably the polyorganosiloxane component, of the block polyorganosiloxane block hydrocarbon polymer, has a similar, or even identical—or at least substantially or essentially identical—chemical structure to that of the nonfunctional polyorganosiloxane. As a matter of particular preference in this instance, both the nonfunctional polyorganosiloxane of the blend or mixture, and the polysiloxane organosiloxane component—i.e., the one or more polyorganosiloxane blocks—of the block polyorganosiloxane block organomer polymer, are nonfunctional polydimethylsiloxanes.

However, if the release agent blend or mixture comprises more than 50 percent by volume, of the polymer of the invention, then it is not significant whether the indicated chemical structures are the same or different. In this instance, the block polyorganosiloxane block organomer polymer of the invention may be considered the primary component of the blend or mixture, and not an additive.

Release agent blends and mixtures of the invention preferably have a viscosity of from about 150 to about 100,000 cSt, at 25° C. More preferably, these blends and mixtures have a viscosity of from about 200 to about 70,000 cSt, at 25° C.

Suitable release agent compositions of the invention include those comprising about 30 percent or less by weight of the block polyorganosiloxane block organomer polymer of the invention. The compositions further can include polyorganosiloxanes, as discussed, particularly nonfunctional polyorganosiloxanes.

A preferred release agent composition of the invention comprises about 4.4 percent by weight block polyorganosiloxane block organomer polymer of the invention, in a 60,000 cSt polydimethylsiloxane liquid. Another preferred release agent composition of the invention comprises about 12.5 percent by weight of the polymer in a 350 cSt polydimethylsiloxane liquid. Preferably in these compositions, the polymer of the invention is dispersed in the polydimethylsiloxane liquid.

And where the organomer component comprises one or more halocarbyl blocks and/or one or more perhalopolyether blocks, the polymer of the invention will be effective even at very low levels. Here the polymer may comprise as little as about 1 percent by weight, or even 0.5 percent by weight, of the release agent composition.

Further in this regard, suitable release agent compositions of the invention include those comprising from about 0.5 percent to about 50 percent by weight block polyorganosiloxane block organomer polymer of the invention, in a nonfunctional polyorganosiloxane having a viscosity of from about 100 cSt to about 160,000 cSt. More preferred are compositions comprising from about 2 percent to about 20 percent by weight block polyorganosiloxane block organomer polymer of the invention, in a nonfunctional polyorganosiloxane having a viscosity of from about 200 cSt to about 100,000 cSt. Still more preferred are compositions comprising from about 4 percent to about 15 percent by weight block polyorganosiloxane block organomer polymer of the invention, in a nonfunctional polyorganosiloxane having a viscosity of from about 250 cSt to about 80,000 cSt.

Also suitable are release agent compositions comprising from about 1 percent to about 15 percent by weight block polyorganosiloxane block organomer polymer of the invention, and from about 1 percent to about 15 percent by weight functional polyorganosiloxane, in a nonfunctional polyorganosiloxane having a viscosity of from about 100 cSt to about 160,000 cSt—more preferably, of from about 200 cSt to about 80,000 cSt. Suitable functional polyorganosiloxanes for this purpose are the carboxy, amino, mercapto, silane, and phenol functional polyorganosiloxanes.

With respect to the foregoing, the preferred nonfunctional and functional polyorganosiloxanes are the nonfunctional and functional polydimethylsiloxanes.

A particular release agent composition of the invention comprises about 4.4 percent by weight polymer of the invention in 60,000 cSt DC200® polydimethylsiloxane, with the polymer prepared from Unicid® 700 and an α-aminopropyldimethylsiloxy, ω-trimethylsiloxy terminated polydimethylsiloxane having a molecular weight of about 12,000. As a variation, 250 cSt DC200® polydimethylsiloxane may be used, with the composition comprising 12.5 weight percent by weight of the polymer.

In another variation of the indicated 4.4 percent composition, the organomer component of the polymer is derived from perfluorododecanoic acid. And a variation of this composition comprises about 0.5 percent by weight of the indicated fluorine-containing polymer; yet another variation also comprises 0.5 percent of this fluorinated polymer, but in 250 cSt DC200® polydimethylsiloxane.

Yet another release agent composition of the invention comprises both about 4.4 percent by weight of the indicated Unicid®700/aminofunctional PDMS polymer, and also about 0.5 percent by weight of the indicated perfluorododecanoic acid/aminofunctional PDMS polymer, in 60,000 cSt DC200® polydimethylsiloxane. A variation of this composition instead utilizes 250 cSt DC200® polydimethylsiloxane, and 12.5 percent by weight of the Unicid®700/aminofunctional polydimethylsiloxane polymer.

Yet another release agent composition of the invention comprises about 2.2 percent by weight polymer of the invention, about 2.2 percent by weight $\alpha,\omega$ carboxypropyldimethylsiloxy terminated polydimethylsiloxane having a molecular weight of about 24,000, and about 0.22 percent by weight stearic acid, in 60,000 cSt DC200® polydimethylsiloxane. The polymer of the invention is prepared from stearic acid and an $\alpha$-aminopropyldimethylsiloxy, $\omega$-trimethylsiloxy terminated polydimethylsiloxane having a molecular weight of about 12,000.

The release agent of the invention can be employed in the same manner as release agents conventionally are used in toner fusing systems. Specifically, the release agent is applied to the surface of a fuser member, so that during the fusing process the release agent contacts toner on the substrate, and can contact the substrate. The release agent is accordingly transferred to the toner surface through contact with the fuser member surface. Preferably the release agent is applied so as to form a film that completely, or at least essentially, or at least substantially, covers the fuser member surface. Also as a matter of preference, during the operation of the toner fusing system the release agent is applied continuously, or at least essentially continuously, or at least substantially continuously, to the surface of the fuser member.

Further as to application, where the release agent comprises more than one ingredient or component (e.g., two or more block polyorganosiloxane block organomer polymers of the invention; or one or more polymers of the invention, along with one or more nonfunctional polyorganosiloxanes, and/or one or more functional polyorganosiloxanes), the components may be applied simultaneously to the fuser as a blend, or in separate applications using the same or multiple applicators. In the case of multiple applicators, the blend is produced on the fuser member surface.

Typical rates for application to substrate, in the case of paper, are less than 30 microliters (μl) per 8½" by 11" sheet. Application rates are limited by unwanted side effects, such as oil streaks, machine contamination during duplex printing, and oil spots.

Application to the fuser member may be by any suitable applicator, including release agent soaked web, pad, or impregnated roll. Preferably, a means that provides the indicated continuous application, such as a rotating wick oiler or a donor roller oiler, is employed.

A rotating wick oiler comprises a storage compartment for the release agent, or component thereof, and a wick for extending into this compartment. During operation of the toner fusing system of the invention, the wick is situated so as to be in contact with the stored release agent, or component thereof, and also with the fusing surface layer of the fuser member; the wick thusly picks up release agent, or component thereof, and transfers it to the fuser member.

A donor roller oiler is an applicator which includes a metering roller that takes up release agent, or component thereof, from its supply source, a metering blade, which can be a rubber, plastic, or metal blade, that skims excess from the metering roller, and a delivery roller that receives release agent or component thereof from the metering roller, and contacts the fuser member surface to apply release agent or component thereon.

The fuser and support members may be of the type as are generally employed in toner fusing processes. Internal and/or external heating may be employed, and heating means as are known in the art are suitable. Preferably, the means of providing heat for fusing toner and substrate comprise the heating of the fuser member by one or more external and/or internal heating sources, and transmission of this heat from the fuser member to the toner, or to both toner and substrate—preferably by contact.

The fuser member surface may be comprised of any suitable material or materials—preferably, a material or materials such as are conventional in the art. Among the materials that may be used are the polysiloxane elastomers, or silicone rubbers or elastomers; two appropriate commercially available silicone rubbers are Silastic™-J, from Dow Corning Corporation, and EC4952, from Emerson & Cuming ICI, Billerica, Mass. Further eligible materials are polyfluorocarbons, including the fluoroelastomers. Commercially available fluoroelastomers that may be used are those sold by Dupont Dow Elastomers, Stow, Ohio under the trademark Viton®, such as Viton® A, Viton® GF, etc. Also eligible are nonelastomeric fluorocarbon materials, such as fluoroplastics and fluororesins, like polytetrafluoroethylene (PTFE), and copolymers of tetrafluoroethylene (TFE) and perfluoroalkylvinylether (PFA), and fluorinated ethylene propylene copolymers; particularly, the fuser member may comprise a Teflon coating, or a PFA sleeve.

In an embodiment of the toner fusing process of the invention, the precursors may be applied separately to the fuser member surface, with the reaction that takes place between the precursors—to form the block polyorganosiloxane block organomer polymer of the invention—occurring on the fuser member, and the heat of the fusing process facilitating the bonding. The point at which precursors combine can be controlled by where on the fusing surface the different precursors are applied. And by controlling the point of combination, the point of reaction correspondingly can be controlled.

The separate application is provided by employing a separate applicator for each precursor. Controlling the place of precursor application to the fuser member—and thereby exerting the indicated control over point of combination and of reaction—can be effected by the positioning of applicators for different precursors.

The advantage provided by absence, or at least essential absence, of primary amine and isocyanate, as discussed, also accrues where the precursors are separately applied. Specifically, it is preferred that all, or at least essentially all, of the primary amine and isocyanate groups be reacted on the fuser member, and it is accordingly preferred that no, or at least essentially no, unreacted primary amine and isocyanate groups leave the fuser member, or otherwise reach or touch the substrate or toner thereon.

The indicated control over combination and reaction can be utilized to provide these desired results. Particularly, precursor application can be conducted to promote the desired reaction on the fuser member surface.

So when it is primary amino and carboxy or acid chloride functional precursors which are being employed, preferably the applicators are positioned so that the primary amino functional precursor is applied first and the carboxy or acid chloride functional precursor is applied subsequently, or at a position subsequent to the position for application of the primary amino functional precursor, with amino functional precursor accordingly already being on the fuser member surface; additionally as a matter of preference, the indicated carboxy or acid chloride excess is employed in this separate addition. Correspondingly, with isocyanate and hydroxy functional precursors, the applicators preferably are positioned so that the isocyanate functional precursor is applied first and the hydroxy functional precursor is applied subsequently, with isocyanate functional precursor accordingly already being on the fuser member surface; and here, preferably the indicated hydroxy excess is employed.

In the case of isocyanate and primary amine precursors, preferably the relative isocyanate and primary amine proportions as discussed are employed. Also preferably, it is the isocyanate functional precursor that is applied first.

Any suitable applicators may be used, as may any configuration of multiple applicators which will provide the requisite separate application. For instance, dual applicator systems that are known in the art, such as that disclosed in U.S. Pat. No. 4,034,706, may be employed; this patent is incorporated herein in its entirety, by reference thereto.

The invention is illustrated by the following procedures; these are provided for the purpose of representation, and are not to be construed as limiting the scope of the invention. Unless stated otherwise, all percentages, parts, etc. are by weight.

EXPERIMENTAL PROCEDURES

Materials Employed in the Procedures

Unicid®350, 425, 550, and 700 (487, 595, 772, and 888 grams per mole carboxylic acid, respectively), from Baker Petrolite α,ω-aminopropyldimethylsiloxy terminated polydimethylsiloxanes, all from United Chemical Technologies, Inc.: PS510a and b (1370 and 2260 grams per mole amine, respectively); PS511 (3086 grams per mole amine); and PS513a, b, c, and d (11660, 9300, 6165, and 7575 grams per mole amine, respectively)

PS563 α,ω-carboxypropyldimethylsiloxy terminated polydimethylsiloxane, 31,200 grams per mole carboxylic acid, from United Chemical Technologies, Inc.

Stearic acid 98+%; perfluorodecanoic acid 95%; perfluorotetradecanoic acid 97%; perfluorosebacic acid; pentadecafluoroocatanoic acid 96%; dodecyl isocyanate; octylamine 99%; and monohydroxy polydimethysiloxane, about 4670 grams per mole hydroxyl: from Aldrich® Chemical, Milwaukee, Wis.

350, 1,000, and 60,000 centistoke DC200® polydimethylsiloxane, from Dow Corning Corporation Fombline MF-300 monocarboxy functional perfluoropolyether, 650 grams per mole carboxylic acid, from Ausimont USA, Inc.

Monoamino polydimethylsiloxane additive: α-aminopropyldimethylsiloxy, ω-trimethylsiloxy terminated polydimethylsiloxane, number average molecular weight of 12,000, amine equivalent of about 13,000 grams per mole amine Monothiol polydimethylsiloxane additive: α-thiolpropyldimethylsiloxy, ω-trimethylsiloxy terminated polydimethylsiloxane, viscosity of about 80 cSt, about 3,800 grams per mole thiol PFA film, 80 microns thickness, from Saint-Gobain Performance Plastics, Wayne, N.J.

COMPARATIVE EXAMPLES 1–4

Table 1 below lists the ingredients, and amounts thereof, used to prepare the release fluids of Comparative Examples 1–4. As shown in Table 1, the Comparative Example 1 release fluid did not include an additive. Each of the other release compositions comprised 4.4 percent by weight additive in polydimethylsiloxane; this diluent was the 60,000 centistoke DC200®. The listed thiol, amine, and acid, were, respectively, the monothiol and monoamino polydimethylsiloxane additives, and the PS563.

TABLE 1

| Comparative Example | PDMS viscosity (cSt)* | Additive | Additive amt (grams) | 60K PDMS (grams) |
|---|---|---|---|---|
| 1 | 60,000 | None | None | 800 |
| 2 | 60,000 | Thiol | 36 | 764 |
| 3 | 60,000 | Acid | 36 | 764 |
| 4 | 60,000 | Amine | 36 | 764 |

*Measured using a Brookfield Viscometer, from Brookfield Engineering Laboratories, Stoughton, Ma Preparation of Amide Polar Functionality Polymers and Release Fluids of the Invention Amide functional block polyorganosiloxane block hydrocarbon polymers of the invention were prepared, and combined with diluent to provide release compositions of the invention, as set forth in Examples 1–6. Specifically as to Example 6, in fact as stated therein, the attempted preparation of the polymer did not produce the desired result.

Example 1

5.67 grams of Unicid®700 were combined with 94.33 grams of PS513a, and blended at 175° C. for 3 hours. 35.2 grams of the resulting product were combined with 764.8 grams of 60,000 cSt DC200® oil, and blended at room temperature.

Example 2

0.81 grams of stearic acid were combined with 40 grams of PS513b at 80–85° C., until the resulting melt was completely blended, about 30 minutes total. No precipitation of stearic acid was observed on cooling. 20 grams of the resulting product were oven baked at 175° C. for 7 hours to prepare the polymer. 17.6 grams of this product were combined with 382.4 grams of 60,000 cSt DC200® oil, and blended at room temperature.

Example 3

1.17 grams of stearic acid were combined with 40 grams of PS513b at 80–85° C., until the resulting melt was completely blended. No gross precipitation of the stearic acid was observed on cooling; a slight haze was noted. 20 grams of the resulting product were oven baked at 175° C. for 7 hours to prepare the polymer. 17.6 grams of this product were combined with 382.4 grams of 60,000 cSt DC200® oil, and blended at room temperature.

Example 4

2.518 grams of Unicid®700 and 40 grams of PS513b were combined in a flask and heated to about 110° C., with stirring, until melt blended. 20 grams of the resulting product were oven baked at 175° C. for 7 hours to prepare the polymer. 17.6 grams of this product were combined with 382.4 grams of 60,000 cSt DC200® oil, and blended at room temperature.

Example 5

3.62 grams of Unicid®700 and 40 grams of PS513b were combined in a flask and heated to about 110° C., with stirring, until melt blended. 20 grams of the resulting product were oven baked at 175° C. for 7 hours to prepare the polymer. 17.6 grams of this product was combined with 382.4 grams of 60,000 cSt DC200® oil, and blended at room temperature.

Example 6

13.33 grams of Unicid®700 and 20 grams of PS510a were combined in a flask and heated to about 115° C., with stirring, until melt blended. 20 grams of the resulting product, which was a waxy solid, were oven heated at 150° C. for 6 hours, producing a dark brown blend that formed a partial gel as well as phase separating. The heat stability of the blend was not very good, as evidenced by the gel formation and color.

Testing Release Compositions for Combating Toner Offset

An Imagesource 110 electrostatographic copier, from Heidelberg Digital L.L.C., Rochester, was used to test the release compositions of particular Examples and Comparative Examples, to determine their effectiveness in combating toner contamination. Contamination was measured from the toner offset to the cleaning web of the copier.

For the tests, the compositions of the Examples and Comparative Examples were used in place of the standard release oil, and the copier reproduction rate was accelerated to 150 prints per minute. Additionally, a polyester toner was employed, and the fuser setpoint temperatures were varied between a high (365° F.) temperature setpoint and a low (335° F.) temperature setpoint. Otherwise, the materials, hardware, and operating parameters of the copier were left unchanged.

In its operation, the Imagesource 110 copier employs two heater rollers to heat the fuser roller. Toner offset from paper in the copying process is removed from the fuser roller by the heater rollers, by virtue of the high surface energy of the anodized aluminum surface of the heater rollers. The indicated cleaning web is a thin Nomex® web, used to remove toner offset from the heater rollers by contact with both.

With all of the release agent compositions, test runs of 2500 prints were made using a multiple density image. Contamination of the cleaning web was determined by measuring and averaging the optical transmission density, of toner collected on the cleaning web surface. Optical transmission density was measured using an X-Rite 310 Transmission Densitometer, from X-Rite Company, Grand Rapids, Mich.

The density of the toner offset collected by the cleaning web estimates the offset rate of the fuser. As discussed, this offset acts as contamination, and accordingly offset rate indicates the degree of contamination. Therefore, the density of this offset on the web is a measure of the degree of contamination.

In making measurements here, clean webs were used to set the measured optical transmission density to zero. As to the results, in general with respect to contamination, cleaning web transmission densities below 0.3 are excellent, at 0.31 to 0.5 are good, at 0.51 to 0.79 are marginal, and at 0.8 and above are unacceptable.

However, with certain toners—e.g., polyester toners, such as those employed here—even lower contamination levels are desirable, in order to avoid irreversible buildup of contamination on the heater rollers. Specifically, it is believed that in these instances, achieving densities below 0.2 is the objective.

In any event, with respect to density values, a higher web transmission density indicates an increased fuser offset rate, and thusly a greater degree of contamination. Contamination leads to offset on electrostatographic apparatus parts and on images, and yet additionally reduces roller life.

The web transmission density values obtained from the contamination tests are set forth in Table 2.

TABLE 2

|  | High temp | Low temp | Average |
| --- | --- | --- | --- |
| Comparative Example 1 | 1.35 | 0.61 | 0.98 |
| Comparative Example 2 | 0.31 | 1.5 | 0.905 |
| Comparative Example 3 | 0.37 | 0.61 | 0.49 |
| Comparative Example 4 | 0.15 | 0.23 | 0.19 |
| Example 1 | 0.21 | 0.06 | 0.135 |
| Example 3 | 0.14 | 0.36 | 0.25 |
| Example 4 | 0.15 | 0.18 | 0.165 |

The data shown in Table 2 demonstrate that the results obtained, with the amide functional polymers of the invention, were superior to those provided by the nonfunctional, thiol functional, and acid functional silicones. The Table 2 values further demonstrate that on average, the polymers of the invention prepared from Unicid 700 block performed better than the amine functional oil.

Further as to offset, it is noted that toner not collected by the cleaning web may remain on the heater rollers. In this regard, after the tests the heater rollers were checked for contamination. The results are shown in Table 3.

TABLE 3

|  | High temp | Low temp |
| --- | --- | --- |
| Comparative Example 1 | None | Y |
| Comparative Example 2 | None | Y |
| Comparative Example 3 | None | Y |
| Comparative Example 4 | None | None |
| Example 1 | None | None |
| Example 3 | None | Y |
| Example 4 | None | None |

As can be seen, release compositions of the invention resisted contamination where the hydrocarbyl block was longer than 18 carbons; however, with the stearyl block, the heater rollers were not protected. The nonfunctional, thiol functional, and acid functional oils also contaminated the heater rollers.

Example 7

68.39 grams of the monoamino polydimethylsiloxane additive and 1.61 grams of stearic acid were combined and stirred at 105° C. for 15 minutes. A 5 gram sample was removed, and the temperature of the remainder was elevated to 150° C. After 15 additional minutes another 5 gram sample was removed, and stirring of the remainder was continued at 150° C. Thereafter, every 30 minutes yet another 5 gram sample was removed until a total of 180 minutes of heating was completed.

The samples were measured for residual amine content by potentiometric titration in a tetrahydrofuran/methanol mixture results are shown in Table 4.

TABLE 4

| Temperature (° C.) | Total Time (minutes) | Percent amine remaining |
|---|---|---|
| 105 | 15 | 89 |
| 150 | 30 | 32 |
| 150 | 60 | 21 |
| 150 | 90 | 13 |
| 150 | 120 | 7 |
| 150 | 150 | 4 |
| 150 | 180 | 1 |

The values set forth in Table 4 indicate the rate of conversion of the amine. These data demonstrate that the reaction of the amine is substantially complete within 3 hours at 150° C.

Example 8

28.43 grams of PS513c and 1.57 grams of stearic acid were added to a beaker surrounded by a jacket heater, and having a Teflon stirbar for blending the beaker contents. A thermocouple was immersed in the mixture of functional polydimethylsiloxane and stearic acid, in order to monitor temperature.

The mixture was heated to 120–130° C. and blended for 15 minutes. Thereafter the beaker was plunged partially into a water bath to rapidly cool the product. The product then was placed in an oven at 150° C. for 6 hours, and stirred once after melting.

The cooled product, a light yellow semisolid, was added to the amount of 350 cSt DC200® oil required to provide a composition comprising 12.5 percent by weight of the product. The blend remained suspended after 72 hours.

Example 9

Example 8 was repeated, except instead with 1.32 grams of stearic acid, and a mixing time of 1 minute. The cooled product was a translucent yellow viscous liquid, which was added to the amount of 350 cSt DC200® oil required to provide a composition comprising 12.5 percent by weight of the product. The blend remained suspended after 72 hours.

Example 10

Example 8 was repeated again, except here with 1.11 grams of stearic acid, and a mixing time of 5 minutes. The cooled product was a translucent light yellow viscous liquid, which was added to 350 cSt DC200® oil to form a 12.5 percent by weight composition. The blend remained suspended after 72 hours.

Example 11

27.8 grams of PS513c and 2.20 grams of Unicid®350 were combined and blended as described in Example 8, except at 120° C., and for 5 minutes. After oven baking, the cooled product was a light tan opaque semisolid. The product was added to 350 cSt DC200® oil to form a 12.5 percent by weight composition. The blend remained suspended after 72 hours.

Example 12

27.36 grams of PS513c and 2.64 grams of Unicid® 425 were combined and blended as described in Example 11. After oven baking, the cooled product was a light tan opaque semisolid. The product was added to 350 cSt DC200® oil to form a 12.5 percent by weight composition. The blend remained suspended after 72 hours.

Example 13

26.66 grams of PS513c and 3.34 grams of Unicid® 550 were combined and blended as described in Example 11. After oven baking, the cooled product was a light tan opaque semisolid. The product was added to 350 cSt DC200® oil to form a 12.5 percent by weight composition. The blend remained suspended after 72 hours.

Example 14

27.47 grams of PS511b and 2.53 grams of stearic acid were combined and blended at 105° C. for 5 minutes, then placed in an oven at 150C. for 6 hours. The resulting product, a deep yellow translucent soft solid, was added to 350 cSt DC200® oil to form a 12.5 percent by weight composition.

Example 15

5 grams of PS510a and 1 gram of stearic acid were combined and heated at 150° C. for 20 minutes, and the product was subjected to Fourier transform infrared spectroscopy (IR). Infrared spectroscopy of the functional groups was used to determine the state of the reaction.

The spectroscopy showed formation of an amide peak at 3312. However, the spectra of the relevant compounds—i.e., the acid and amine reactants, and the prospective amide product—were difficult to observe, due to the high molecular weight of the PS510a, and the resulting low concentration of the compounds' functional groups. Therefore, in place of PS510a, octadecylamine—with a much lower molecular weight, and therefore a higher amine concentration—was employed as a model amine and reacted with the stearic acid, so that the changes in infrared adsorption could be ascertained.

0.425 grams of Octadecylamine and 0.468 grams of stearic acid (1:1 mole ratio of carboxylic acid to primary amine groups) were combined and heated at 150° C. for 1 hour. IR showed an amide peak at 3310, elimination of the primary amine peak at 3330, and substantial reduction of the stearic acid peak at about 1700. These results indicate that the reaction of amine and acid, to produce amide, did occur.

Preparation of Fluorocarbon Block Polymers and Release Fluids of the Invention

Example 16

0.0558 grams of MF-300 and 1 gram of PS513a (1:1 molar ratio of carboxylic acid to primary amine groups) were combined at room temperature. The silicone and perfluoropolyether blended easily to a single clear phase.

This mixture was heated in an oven at 175° C. for 1 hour, and formed a hazy pale yellow liquid. This product was added to 1,000 cSt DC200® oil to form a 12.5 percent by weight composition.

Example 17

2 grams of perfluorododecanoic acid and 37.9 grams of PS513a were combined in a beaker and placed on a hot plate with a Teflon stir bar. The mixture was stirred at 100° C. for about 3 hours, and formed a hazy yellow liquid. This product was added to 1,000 cSt DC200® oil to form a 12.5 percent by weight composition.

Example 18

5.67 grams of Unicid®700 were combined with 94.33 grams of PS513a, and blended at 175° C. for 3 hours. 35.2 grams of the resulting product were added to 1,000 cSt DC200 oil to form a 12.5 percent by weight composition.

COMPARATIVE EXAMPLES 5–8

Comparative Examples 5–8 were prepared in substantially the same manner as Comparative Examples 1–4, respectively, except with 1,000 cSt DC200®, and 12.5 percent additive.

Wetting of PTFE

Drops of the oils of Examples 16-18 and Comparative Examples 5–8 were placed on a cleaned Teflon sheet. A VCA-2500 XE video contact angle measurement apparatus, from ASE Americas, Inc., Billerica, Mass., was used to measure the contact angle of the drops with the Teflon surface. The time elapsed between the placement of the drop and when the drop was measured is indicated. After the first set of measurements, a portion of fluid from the top of the drop was removed with a syringe to determine the receding contact angle. The drop was then heated to 200° C. for 10 minutes and remeasured.

The contact angle measurements thusly obtained are shown in Table 5.

TABLE 5

| (all at 12.5% additive) | Advancing angle at room temperature | | | | After 200° C. for 10 Minutes |
|---|---|---|---|---|---|
| Time: | 0 min | 10 min | 30 min | Receding | |
| Comparative Example 5 | 31.40 | 32.36 | 31.34 | 14.9 | 24.26 |
| Comparative Example 6 | 34.35 | 33.40 | 28.29 | 11.9 | — |
| Comparative Example 7 | 38.36 | 33.35 | 38.37 | 27.28 | — |
| Comparative Example 8 | 36.38 | 30.34 | 24.26 | 24.33 | 25.23 |
| Example 16 | 34.35 | 22.28 | 22.24 | 7.8 | 0* |
| Example 17 | 32.33 | 21.26 | 16.18 | 0* | 0* |
| Example 18 | 42.38 | 34.38 | 36.34 | 18.15 | — |

— not tested
*angle too small to measure, less than 2 degrees or zero.

The values set forth in Table 5 demonstrate the improved wetting of fluorocarbon surfaces with block polyorganosiloxane block fluorocarbon release compositions of the invention. Most fluids show no tendency to wet Teflon; this is not the case with the fluorocarbon block compositions of Examples 16 and 17. Receding angles were lower and noisy. While the fluorocarbon block compositions show zero or very low angles, the nonfunctional oil of Comparative Example 5 appears lower than the functional oils. However, once heated, the nonfunctional polydimethylsiloxane quickly regained a high contact angle, while the fluorocarbon block oils fully wet the Teflon surface. The hydrocarbon block oil of Example 18 showed no greater tendency than the oils of Comparative Examples 5–8 to wet Teflon surfaces.

Example 19

0.431 grams of perfluorotetradecanoic acid and 4.581 grams of PS513d were combined in a beaker, and heated to about 120–130° C., with mixing. The resulting mixture evolved some gas bubbles and became a viscous liquid with a clear yellow cast. On cooling, the mixture remained translucent after more than 1 week. This product was then heated in an oven at 150° C. for 6 hours, with occasional stirring, and thereafter allowed to cool. On cooling, the product was a transparent semisolid with a slight haze.

Example 20

0.4 grams of perfluorosebacic acid and 3.11 grams of PS513d were combined in a beaker, and heated to about 140–150° C., with mixing. The resulting mixture evolved some gas bubbles and became a viscous liquid with a translucent yellow cast. On cooling, the mixture turned opaque after about 2 days. This product was then heated in an oven at 150° C. for 6 hours, with occasional stirring, and thereafter allowed to cool. On cooling, the product was a clear darker yellow semisolid.

Example 21

0.254 grams of pentadecafluoroocatanoic acid and 4.625 grams of PS513d were combined in a beaker, and heated to about 100° C., with mixing. The resulting mixture evolved some gas bubbles and became a clear liquid with a yellow cast. On cooling, the mixture became opaque after about 2 days. This product was then heated in an oven at 150° C. for 6 hours, with occasional stirring. On cooling, the product was a translucent semisolid.

Example 22

0.295 grams of perfluorododecanoic acid and 3.64 grams of PS513d were combined in a beaker, and heated to about 110–120° C., with mixing. The resulting mixture evolved some gas bubbles and attained a clear yellow cast. On cooling, the mixture remained translucent after more than 48 hours. This product was then heated in an oven at 150° C. for 6 hours, with occasional stirring. On cooling, the product was a light yellow-brown translucent semisolid.

Example 23

0.278 grams of perfluorotetradecanoic acid and 5.146 grams of the monoamino polydimethylsiloxane additive were combined in a beaker, and heated to about 110–120° C., with mixing. The mixture evolved some gas bubbles and attained a clear yellow cast. On cooling, the mixture remained clear after more than 2 days. This product was then heated in an oven at 150° C. for 6 hours, with occasional stirring. On cooling, the product was a deep yellow clear fluid.

Example 24

0.354 grams of perfluorosebacic acid and 4.787 grams of the monoamino polydimethylsiloxane additive were combined in a beaker, and heated to about 140–150° C., with mixing. The mixture evolved some gas bubbles and became a viscous liquid with a translucent yellow cast. On cooling, the mixture turned opaque after about 2 days. This product was then heated in an oven at 150° C. for 6 hours, with occasional stirring. On cooling, the product was a clear yellow semi-solid with a slight haze.

Example 25

0.172 grams of pentadecafluoroocatanoic acid and 5.553 grams of the monoamino polydimethylsiloxane additive were combined in a beaker, and heated to about 100° C., with mixing. The mixture evolved some gas bubbles and became a clear liquid with a yellow cast. On cooling, the mixture remained clear after more than 2 days. This product was then heated in an oven at 150° C. for 6 hours, with occasional stirring. On cooling, the product was a clear yellow fluid.

Example 26

0.263 grams of perfluorododecanoic acid and 5.716 grams of the monoamino polydimethylsiloxane additive were combined in a beaker, and heated to about 110–120° C., with mixing. The mixture evolved some gas bubbles and attained a clear yellow cast. On cooling, the mixture remained clear after more than 48 hours. This product was then placed in an oven at a 150° C. for 6 hours, with occasional stirring. On cooling, the product was a clear yellow fluid.

Wetting of a PFA Surface

A 1 inch by ½ inch rectangle of the PFA sleeve material was cleaned with 200 proof ethanol and taped flat. Release fluids were prepared from the fluorocarbon block polymer additives of Examples 20 and 22–25, by adding together the amounts of additive and 350 cSt DC200® oil as set forth in Table 6, so as to provide compositions comprising 12.5 percent by weight of the additive. A control, of 350 cSt DC200® oil with no additive, was also employed.

With each composition, a drop of release fluid was placed on the surface and spread thinly and evenly with a small wooden stick. The dimensions of the spread patch were noted and the sample monitored—in accordance with the conditions set forth in Table 6—for dewetting from the PFA surface.

The samples were subjected to observation and treatment, in accordance with the conditions set forth in Table 6, to determine the extent of dewetting. In this regard, dewetting is characterized by the spread layer pulling together into one or more small droplets, while partial dewetting is characterized by a slight contraction of the spread film.

The results observed also are shown in Table 6.

TABLE 6

| Additive (amt in grams) | DC200 350 cSt fluid (amt in grams) | Observation | Time | After heating to 150° C. for 3 hours |
|---|---|---|---|---|
| Control (none) | 3.0 | Rapidly dewet | 1 min | Dewet |
| Example 20 (0.375) | 2.625 | Partially dewet | 30–40 min | Dewet |
| Example 22 (0.378) | 2.620 | Remained spread | >2 hour | Partially dewet |
| Example 23 (0.376) | 2.625 | Slowly dewet | 30–40 min | Dewet |
| Example 24 (0.372) | 2.630 | Partially dewet | 30–40 min | Dewet |
| Example 25 (0.376) | 2.626 | Remained spread | >2 hour | Remained spread |
| Example 25 (0.0177) | 2.92 | Remained spread | >2 hour | Dewet |
| Example 25 (0.00094) | 3.155 | Slowly dewet | 20 min | Dewet |

Preparation of Urea and Urethane Polar Functionality Polymers of the Invention

Example 27

16.05 grams of the monoamino polydimethylsiloxane additive was placed in a flask. The flask was closed with a stopper, which was provided with an outlet for escaping gas. A nitrogen source was inserted through the stopper, with its outlet placed below the surface of the liquid additive. The liquid was stirred with a magnetic stir bar. For 18 hours, dry nitrogen from the source was bubbled through the outlet into the stirred liquid, thereby purging the liquid, forming a nitrogen atmosphere in the flask, and exiting through the outlet. After this 18 hour purge, the nitrogen source outlet was raised above the surface of the liquid, with nitrogen output continuing, thereby maintaining the nitrogen atmosphere. 0.285 ml (0.25 grams) of dodecyl isocyanate was injected through the stopper into the flask. With stirring also continuing, the siloxane and the isocyanate were blended at room temperature. The liquid turned clear and became more viscous, attaining a light straw color. The liquid remained clear after more than 72 hours.

Example 28

Example 27 was repeated, except with 11.05 grams of monohydroxy polydimethylsiloxane in place of the monoamino polydimethylsiloxane, and with 0.57 ml (0.5 grams) of dodecyl isocyanate. The liquid generated bubbles, turned hazy, and became more viscous.

Finally, although the invention has been described with reference to particular means, materials, and embodiments, it should be noted that the invention is not limited to the particulars disclosed, and extends to all equivalents within the scope of the claims.

What is claimed is:

1. A composition comprising:
    a polymer comprising:
        (a) a polyorganosiloxane component, the poly-organosiloxane component comprising at least one poly-organo-siloxane block;
        (b) an organomer component, the organomer component comprising at least one organomer block, the at least one organomer block comprising at least one member selected from the group consisting of perhalopolyether blocks, hydrocarbyl blocks comprising at least about 40 C atoms, and halocarbyl blocks; and (c) at least one polar linkage:
  (1) comprising a polar functionality having a polarity value of at least about 1.8; and
  (2) covalently bonding a polyorganosiloxane block of the polyorganosiloxane component, and an organomer block of the organomer component wherein said polymer is liquid at temperatures from 90° C.–220° C.; and
a polyorganosiloxane release agent selected from the group consisting of the nonfunctional poly-organosiloxanes, mercapto functional polyorganosiloxanes, carboxy functional polyorganosiloxanes, hydroxy functional polyorganosiloxanes, epoxy functional polyorganosiloxanes, amino functional polyorganosiloxanes, isocyanate functional polyorganosiloxanes and thioether functional polyorganosiloxancs.

2. The composition of claim 1, wherein the covalently bonded organomer block comprises a hydrocarbyl block comprising at least about 50 C atoms.

3. The composition of claim 1, wherein the covalently bonded organomer block comprises a perfluoropolyether block.

4. The composition of claim 1, wherein the covalently handed organomer block comprises a fluorocarhyl block.

5. The composition of claim 4, wherein the polar functionality comprises a hydrogen bondable H atom.

6. The composition of claim 5, wherein the polar functionality has a polarity value of at least about 2.0, and further comprises a hydrogen bond donor and a hydrogen band acceptor, the hydrogen bond donor comprising the hydrogen bondable H atom.

7. The composition of claim 1, wherein the polar functionality comprises a hydrogen bondable H atom.

8. The composition of claim 7, wherein the polar functionality has a polarity value of at least about 2.0, and further comprises a hydrogen band donor and a hydrogen bond acceptor, the hydrogen bond donor comprising the hydrogen bondable H atom.

9. A release agent composition for application to fuser members in toner fusing systems, the release agent composition comprising a polymer comprising:
(a) a polyorganosiloxane component, the poly-organosiloxane component comprising at least one polyorganosiloxane block;
(b) an organomer component, the organomer component comprising at least one organomer block, the at least one organomer block comprising at least one member selected from the group consisting of perhalopolyether blocks and hydrocarbyl blocks; and
(c) at least one polar linkage:
  (1) comprising a polar functionality having a polarity value of at least about 2.0, and comprising a hydrogen bond acceptor and a hydrogen bond donor, the hydrogen bond donor comprising a hydrogen bondable H atom; and
  (2) covalently bonding a polyorganosiloxane block of the polyorganosiloxane component, and an organomer block of the organomer component wherein said polymer is liquid at temperatures from 90° C.–220° C.; and
a polyorganosiloxane release agent selected from the group consisting of the nonfunctional poly-organosiloxanes, mercapto functional polyorganosiloxanes, carboxy functional polyorganosiloxanes, hydroxy functional polyorganosiloxanes, epoxy functional polyorganosiloxanes, amino functional polyorganosiloxanes, isocyanate functional polorganosiloxanes and thioether functional polyorganosiloxanes.

10. The composition of claim 9, wherein an atom of the hydrogen bond donor is covalently bonded to an atom of the hydrogen bond acceptor.

11. The composition of claim 9, wherein the hydrogen bond donor comprises —NH—, and the hydrogen bond acccptor comprises —CO—.

12. The composition of claim 9, wherein the polar functionality comprises an amide incorporating group.

13. The composition of claim 12, wherein the amide incorporating group comprises an amide group.

14. The composition of claim 12, wherein the amide incorporating group comprises a member selected from the group consisting of a urea group and a urethane group.

15. The composition of claim 9 wherein the molecular weight ot tbe polyorganosiloxane component comprises more than 50 percent of the molecular weight of the polymer.

16. The composition of claim 9, wherein at least one polar linkage comprises a $C_3$ or greater hydrocarbyl spacer group connecting the polar functionality of the polar linkage to the polyorganosiloxane block covalcutly bonded by the polar linkagc, the $C_3$ or grcatcr hydrocarbyl spacer group comprising at least three carbon atoms separating the polar linkage from the polyorganosiloxane block.

17. The composition of claim 9, wherein:
(a) the at least one polyorganosiloxane block comprises a first polyorganosiloxane block and a second polyorganosiloxane block;
(b) the at least one organomer block comprises a first organomer block; and
(c) the at least one polar linkage comprises:
  (1) a first polar linkage, covalently bonding the first polyorganosiloxane block and the first organomer block; and
  (2) a second polar linkage, covalently bonding the second polyorganosiloxane block and the first organomer block.

18. The composition of claim 9, wherein:
(a) the at least one polyorganosiloxane block comprises a first polyorganosiloxane block;
(b) the at least one organomer block comprises a first organomer block and a second organomer block; and
(c) the at least one polar linkage comprises:
  (1) a first polar linkage, covalently bonding the first polyorganosiloxane block and the first organomer block; and
  (2) a second polar linkage, covalently bonding the first polyorganosiloxane block and the second organomer block.

19. The composition of claim 9, wherein:
(a) the at least one organomer block comprises at least one hydrocarbyl block; and
(b) for each polyorganosiloxane block and each hydrocarbyl block, the mole ratio of polyorganosiloxane block Si atoms to hydrocarbyl block C atoms is from about 1:1.5 to about 30:1.

20. The composition of claim 9, wherein;
(a) the at least one polyorganosiloxane block comprises at least one polydimethylsiloxane block, the at least one polydimethylsiloxane block comprising a first polydimethylsiloxane block;
(b) the at least one organomer block comprises at least one alkyl block, the at least one alkyl block comprising a first alkyl block; and (c) the at least one polar linkage comprises a first polar linkage, covalently bonding the first polydimethylsiloxane block and the first alkyl block.

21. The composition of claim 20, wherein each alkyl block comprises at least about 30 C atoms.

22. The composition of claim 20, wherein for each polydimethylsiloxane block and each alkyl block the mole ratio of polyalkylsiloxane block Si atoms to alkyl block C atoms is from about 2:1 to about 20:.

23. The composition of claim 20, wherein fox each poly-dimethylsiloxane block and each alkyl block, the ratio of polydimethylsiloxane block molecular weight to alkyl block molecular weight is from about 12:1 to about 55:1.

24. The composition of claim 9, wherein:
(a) the at least one polyorganosiloxane block comprises at least one polydimethylsiloxane block, the at least one polydimethylsiloxane block comprising a first polydimethylsiloxane block;
(b) the at least one organomer block comprises at least one perfluoroalkyl block, the at least one perfluoro-alkyl block comprising a first perfluoroalkyl block; and
(c) the at least one polar linkage comprises a first polar linkage, covalently bonding the first polydimethylsiloxane block and the first perfluoroalkyl block.

25. The composition of claim 24, wherein each perfluoroalkyl block comprisca from about 8 C atoms to about 20 C atoms.

26. The composition of claim 24, wherein for each polydimethylsiloxane block and each perfluoroalkyl block, the mole ratio of polydimethylsiloxane block Si atoms to perfluoroalkyl block C atoms is from about 4:1 to about 70:1.

27. The composition of claim 9, wherein:
(a) the at least one polyorganosiloxane block comprises at least one polydimethylsiloxane block, the at least one polydimethylsiloxane block comprising a first polydimethylsiloxane block;
(b) the at least one organomer block comprises at least one perfluoropolyether block, the at least one pertfluoropolyether block comprising a first perfluoropolyether block; and
(c) the at least one polar linkage comprises a first polar linkage, covalently bonding the first polydimethylsiloxane block and the first perfluoropolyether block.

28. The composition of claim 27, wherein each perfluoropolyether block has a molecular weight of from about 400 to about 8,000.

29. The composition of claim 27, wherein for each polydimethylsiloxane block and each perfluoropolyether block, the mole ratio of polydimethylsiloxane block Si atoms to perfluoropolyether block C atoms is from about 2:1 to about 70:1.

30. The release agent composition of claim 9, wherein the molecular weight of the polyorganosiloxane component of the polymer comprises at least 75 percent of the molecular weight of the polymer.

31. The release agent composition of claim 30, wherein:
(a) the at least one polyorganosiloxane block of the polymer comprises at least one nonfunctional polydimethylsiloxane block; and
(b) the polyorganosiloxane release agent comprises a nonfunctional polydimethylsiloxane;
the polymer comprising not more than about 50 percent by volume of the release agent composition.

32. The release agent composition of claim 31, wherein:
(a) the at least one organomer block of the polymer comprises at least one member selected front the group consisting of alkyl blocks, perfluoropolyether blocks, and fluoroalkyl blocks;
(b) the polymer comprises from about 2 percent to about 15 percent by weight of the release agent composition; and
(c) the nonfunctional polydimethylsiloxane has a viscosity of from about 250 cSt to about 80,000 cSt.

33. The release agent composition of claim 31, wherein:
(a) the at least one organomer block of the polymer comprises at least one member selected from the group consisting of alkyl blocks, perfluoropolyether blocks, and fluoroalkyl blocks;
(b) the polymer comprises from about 1 percent to about 15 percent by weight of the release agent composition; and
(c) the nonfunctional polydimethylsiloxane has a viscosity of from about 200 cSt to about 80,000 cSt;
the release agent composition further comprising from about 1 percent to about 15 percent by weight functional polyorgano-siloxane release agent, the functional polyorganosiloxane release agent comprising a functional polyorganosiloxane selected from the group consisting of carboxy, amino, mercapto, silane, and phenol functional polyorganosiloxanes.

* * * * *

UNITED STATES PATENT AND TRADEMARK OFFICE
CERTIFICATE OF CORRECTION

PATENT NO. : 7,157,543 B2
APPLICATION NO. : 11/103398
DATED : January 2, 2007
INVENTOR(S) : Pickering It is certified that error appears in the above-identified patent and that said Letters Patent is hereby corrected as shown below:

Column 39, line 16, delete "polyorganosiloxancs." and insert -- polyorganosiloxanes. --.

Column 39, line 24, delete "handed" and insert -- bonded --.

Column 39, line 24, delete "fluorocarhyl" and insert -- fluorocarbyl --.

Column 39, line 29, delete "band" and insert -- bond --.

Column 39, line 36, delete "band" and insert -- bond --.

Column 40, line 1, delete "polorganosiloxanes" and insert -- polyorganosiloxanes --.

Column 40, line 8, delete "acccptor" and insert -- acceptor --.

Column 40, line 17, delete "ot tbe" and insert -- of the --.

Column 40, line 23-24, delete "covalcutly bonded by the polar linkagc, the C3 or grcatcr" and insert -- covalently bonded by the polar linkage, the C3 or greater --.

Column 40, line 60, delete "wherein;" and insert -- wherein: --.

Column 41, line 7, before "the mole" and insert -- , --.

Column 41, line 10, delete "whereIn fox" and insert -- wherein for --.

Column 41, line 26, delete "comprisca" and insert -- comprises --.

Column 41, line 39-41, delete "perfluoropolyether" and insert -- perfluoropolyether --.

UNITED STATES PATENT AND TRADEMARK OFFICE
CERTIFICATE OF CORRECTION

PATENT NO. : 7,157,543 B2
APPLICATION NO. : 11/103398
DATED : January 2, 2007
INVENTOR(S) : Pickering It is certified that error appears in the above-identified patent and that said Letters Patent is hereby corrected as shown below:

Column 42, line 20, delete "front" and insert -- from --.

Signed and Sealed this

Thirty-first Day of July, 2007

JON W. DUDAS
*Director of the United States Patent and Trademark Office*